(12) United States Patent
Ikeda

(10) Patent No.: US 11,106,920 B2
(45) Date of Patent: Aug. 31, 2021

(54) PEOPLE FLOW ESTIMATION DEVICE, DISPLAY CONTROL DEVICE, PEOPLE FLOW ESTIMATION METHOD, AND RECORDING MEDIUM

(71) Applicant: NEC CORPORATION, Tokyo (JP)

(72) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/590,441

(22) Filed: Oct. 2, 2019

(65) Prior Publication Data

US 2020/0050873 A1 Feb. 13, 2020

Related U.S. Application Data

(63) Continuation of application No. 16/322,345, filed as application No. PCT/JP2017/027797 on Aug. 1, 2017, now Pat. No. 10,936,882.

(30) Foreign Application Priority Data

Aug. 4, 2016 (JP) ................. 2016-153571

(51) Int. Cl.

| G06K 9/00 | (2006.01) |
|---|---|
| G06K 9/62 | (2006.01) |
| G06T 7/20 | (2017.01) |
| G06T 7/215 | (2017.01) |
| G06T 7/246 | (2017.01) |
| G06K 9/66 | (2006.01) |
| G08B 13/196 | (2006.01) |

(Continued)

(52) U.S. Cl.
CPC ..... *G06K 9/00778* (2013.01); *G06K 9/00362* (2013.01); *G06K 9/00369* (2013.01);
(Continued)

(58) Field of Classification Search
CPC .......... G06K 9/00778; G06K 9/00362; G06K 9/2054; G06K 9/00369; G06K 9/66;
(Continued)

(56) References Cited

U.S. PATENT DOCUMENTS

2009/0222388 A1 9/2009 Hua et al.
2009/0296989 A1 12/2009 Ramesh et al.
(Continued)

FOREIGN PATENT DOCUMENTS

JP 2003-109001 A 4/2003
JP 2009-211311 A 9/2009
(Continued)

OTHER PUBLICATIONS

International Search Report for PCT/JP2017/027797 dated Oct. 24, 2017 [PCT/ISA/210].
(Continued)

*Primary Examiner* — Andrew M Moyer
(74) *Attorney, Agent, or Firm* — Sughrue Mion, PLLC

(57) ABSTRACT

A people-flow-estimation device includes a person-count-estimation unit for estimating the number of people included in a partial area of an image; a crowd-direction-estimation unit for estimating the direction of a crowd in the partial area; a movement-amount-estimation unit for estimating the amount of movement in the partial area; and a generation unit for extracting a partial area where people exist from a plurality of partial areas on the basis of the number of people and generating, on the basis of the number of people, the extracted partial area, and the direction and movement amount of a crowd associated with the partial area, people's flow information relating to a people's flow representing the flow of people in the partial area.

15 Claims, 18 Drawing Sheets

(51) Int. Cl.
*H04W 4/02* (2018.01)
*G06K 9/20* (2006.01)

(52) U.S. Cl.
CPC ......... *G06K 9/2054* (2013.01); *G06K 9/6218* (2013.01); *G06K 9/66* (2013.01); *G06T 7/20* (2013.01); *G06T 7/215* (2017.01); *G06T 7/248* (2017.01); *G08B 13/19673* (2013.01); *H04W 4/023* (2013.01); *G06T 2207/30196* (2013.01); *G06T 2207/30232* (2013.01); *G06T 2207/30242* (2013.01)

(58) Field of Classification Search
CPC ....... G06K 9/6218; G06T 7/215; G06T 7/248; G06T 7/20; G06T 2207/30242; G06T 2207/30196; G06T 2207/30232; G08B 13/19673; H04W 4/023; H04W 4/21; H04W 4/021; H04W 4/026; H04W 4/029
USPC ................... 382/100, 103, 106, 107
See application file for complete search history.

(56) References Cited

U.S. PATENT DOCUMENTS

| | | | |
|---|---|---|---|
| 2010/0027875 A1* | 2/2010 | Hampapur | G06K 9/00778 382/159 |
| 2013/0113934 A1* | 5/2013 | Hotta | G08B 13/19613 348/143 |
| 2016/0132755 A1 | 5/2016 | Ikeda | |
| 2016/0133025 A1 | 5/2016 | Wang et al. | |
| 2017/0124430 A1 | 5/2017 | Ohira et al. | |
| 2017/0256044 A1 | 9/2017 | Maruyama | |

FOREIGN PATENT DOCUMENTS

| | | |
|---|---|---|
| JP | 2010-198566 A | 9/2010 |
| JP | 2012-022370 A | 2/2012 |
| JP | 2015-194915 A | 11/2015 |
| WO | 2014/207991 A1 | 12/2014 |
| WO | 2016/114134 A1 | 7/2016 |

OTHER PUBLICATIONS

Written Opinion for PCT/JP2017/027797 dated Oct. 24, 2017 [PCT/ISA/237].

U.S. Notice of Allowance for U.S. Appl. No. 16/322,345 dated Oct. 28, 2020.

U.S. Office Action for U.S. Appl. No. 16/590,436 dated Nov. 24, 2020.

\* cited by examiner

Fig.5

| PARTIAL AREA ID | NUMBER OF PEOPLE (PEOPLE) | AREA OF PERSON | | MOVEMENT STATE OF PERSON | |
|---|---|---|---|---|---|
| | | POSITION (x COORDINATE, y COORDINATE) | SIZE (NUMBER OF VERTICAL PIXELS × NUMBER OF HORIZONTAL PIXELS) | CROWD DIRECTION | PRESENCE OR ABSENCE OF CROWD MOTION |
| IDP1 | 5 | (x1, y1) | h1 × d1 | DOWN | ABSENT |
| IDP2 | 0 | (x2, y2) | h2 × d2 | — | — |
| IDP3 | 3 | (x3, y3) | h3 × d3 | RIGHT | PRESENT |
| IDP4 | 0 | (x4, y4) | h4 × d4 | — | — |

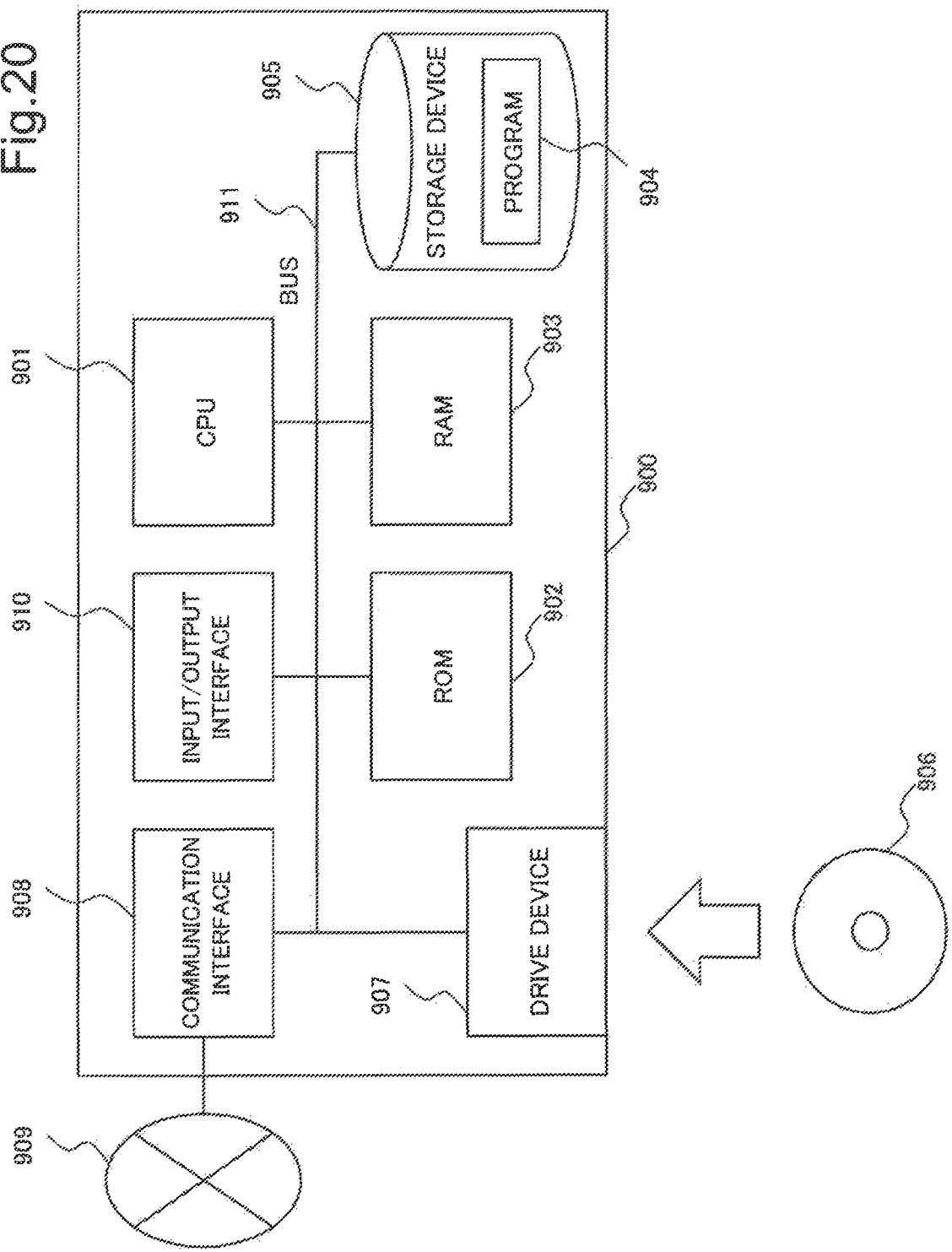

PEOPLE FLOW ESTIMATION DEVICE, DISPLAY CONTROL DEVICE, PEOPLE FLOW ESTIMATION METHOD, AND RECORDING MEDIUM

CROSS-REFERENCE TO RELATED APPLICATIONS

This application is a Continuation of U.S. application Ser. No. 16/322,345 filed Jan. 31, 2019, which is a National Stage of International Application No. PCT/JP2017/027797 filed Aug. 1, 2017, claiming priority based on Japanese Patent Application No. 2016-153571 filed Aug. 4, 2016, the disclosure of which is incorporated herein in its entirety by reference.

TECHNICAL FIELD

The present disclosure relates to a people-flow estimation device, a display control device, a people-flow estimation method, and a recording medium.

BACKGROUND ART

There is considered a method of estimating flow of people (referred to as people-flow) composed of an area of a person and a movement state.

For example, PTL 1 describes a device which detects, from a frame image captured by an imaging unit, an upper body of a person imaged in the frame image. The device detects persons in a plurality of frames, and determines the persons in the frames are same when a distance between upper body positions of the persons is minimized. And then, the device generates a trajectory of each person.

Furthermore, PTL 2 describes a device that sets a head model from images constituting one frame of a moving image in which a plurality of people are imaged. The device extracts a head of a person from an image based on the head model. The device associates heads extracted in a plurality of images with one another based on closeness of positions or based on closeness of image feature amounts, which is based on the positions. And then, the device tracks a person and measures a number of people.

PTL 3 describes a system which acquires a velocity vector of a pixel from a change in a luminance value of a pixel of an image captured by a camera, and acquires a distribution status of a velocity field for each predetermined direction indicated by the velocity vector. The system detects, based on the results, a person shape image and a movement direction thereof in the image.

Also, PTL 4 describes a method of generating supervised data to be used when a dictionary of an identifier serving to recognize a crowd state is machine-learned.

CITATION LIST

Patent Literature

[PTL 1] Japanese Unexamined Patent Application Publication No. 2009-211311
[PTL 2] Japanese Unexamined Patent Application Publication No. 2010-198566
[PTL 3] Japanese Unexamined Patent Application Publication No. 2003-109001
[PTL 4] International Publication No. WO2014/207991

SUMMARY OF INVENTION

Technical Problem

However, it becomes difficult, due to a low frame rate, to perform tracking using a distance between positions or the like as a condition, when an upper body position or a head position acquired from a certain image is too far from such a position on a next image. Because of that, techniques described in PTLs 1 to 3 may not accurately estimate people-flow at a low frame rate. Another reason is that appearance on an image considerably changes, and it becomes difficult to associate a head by closeness of an image feature amount, when a head position acquired from a certain image is too far in terms of time from a head position acquired from a next image, due to a low frame rate. Still another reason is that a search range for associating an image feature amount is expanded, and association becomes difficult, when a head position acquired from a certain image is too far in terms of position from a head position acquired from a next image, due to a low frame rate. Yet another reason is that an upper body position or a head position acquired from a certain image becomes easily framed out and becomes difficult to track in a next image, due to a low frame rate. Yet another reason is that it becomes difficult to correctly compute a motion vector of an object, when information acquired from a certain image is too far in terms of time from information acquired from a next image, due to a low frame rate.

Furthermore, the techniques described in PTLs 1 to 3 may not accurately estimate people-flow under a congested environment. A reason for this is that an upper body or a head is frequently hidden, and there is a possibility that it becomes difficult to detect an upper body or a head, due to overlap of people under a congested environment. Another reason is that it becomes difficult to correctly acquire an image feature amount, and association becomes difficult, due to hiding resulting from overlap of people under a congested environment. Still another reason is that people are frequently hidden, and it becomes difficult to correctly compute a motion vector, due to overlap of people under a congested environment.

The present disclosure has been made in view of the problems described above, and an object thereof is to provide a technique for highly accurately estimating people-flow from even an image captured under a congested environment and transmitted at a low frame rate.

Solution to Problem

An aspect of the disclosure is a people-flow estimation device. The people-flow estimation device includes number-of-people estimation means for estimating a number of people included in a partial area of an image; crowd direction estimation means for estimating a crowd direction in the partial area; motion amount estimation means for estimating a motion amount in the partial area; and generation means for: extracting a partial area where a person exists, from a plurality of the partial areas, based on the number of people, and generating, based on the number of people, the extracted partial area, and the crowd direction and the motion amount related to the partial area, people-flow information regarding people-flow representing flow of people in the partial area. Wherein the people-flow information includes the number of people related to the partial area, a movement state of a person included in the partial area, and information representing an area of the person.

An aspect of the disclosure is a people-flow estimation device. The people-flow estimation device includes crowd direction estimation means for estimating a crowd direction in a partial area of an image, and calculating reliability corresponding to the direction; motion amount estimation means for estimating a motion amount in the partial area; and generation means for generating, based on the crowd direction, the reliability corresponding to the direction, and the motion amount, people-flow information regarding people-flow representing flow of people in the partial area.

An aspect of the disclosure is a display control device. The display control device includes clustering means for performing clustering, for a partial area indicated as people-flow in an image, on a partial area of the image, based on a distance between partial areas, and similarity in a crowd direction and motion in a partial area; and display control means for calculating, for each cluster, a crowd state indicating an area, a direction, motion, and a number of people of a cluster obtained by clustering, based on information about people-flow in the partial area obtained by clustering, and controlling in such a way as to display the crowd state on a screen in a display mode differing from cluster to cluster.

An aspect of the disclosure is a people-flow estimation method. The people-flow estimation method includes estimating a number of people included in a partial area of an image; estimating a crowd direction in the partial area; estimating a motion amount in the partial area; and extracting a partial area where a person exists, from a plurality of the partial areas, based on the number of people, and generating, based on the number of people, the extracted partial area, and the crowd direction and the motion amount being related to the partial area, people-flow information being information regarding people-flow representing flow of people in the partial area, the people-flow information including the number of people related to the partial area, a movement state of a person included in the partial area, and information representing an area of the person.

A computer program which achieves the above-described people-flow estimation device or people-flow estimation method by a computer, and a computer-readable non-transitory recording medium saving the computer program also fall within the scope of the present disclosure.

Advantageous Effects of Invention

According to the present disclosure, it is possible to highly accurately estimate people-flow from even an image captured under a congested environment and transmitted at a low frame rate.

BRIEF DESCRIPTION OF DRAWINGS

FIG. 5 is a diagram in which information related to a partial area is described for each partial area ID indicating a partial area.

FIG. 20 is a diagram exemplarily describing a hardware configuration of a computer (information processing device) which can achieve each example embodiment.

EXAMPLE EMBODIMENT

First Example Embodiment

Figure 1:
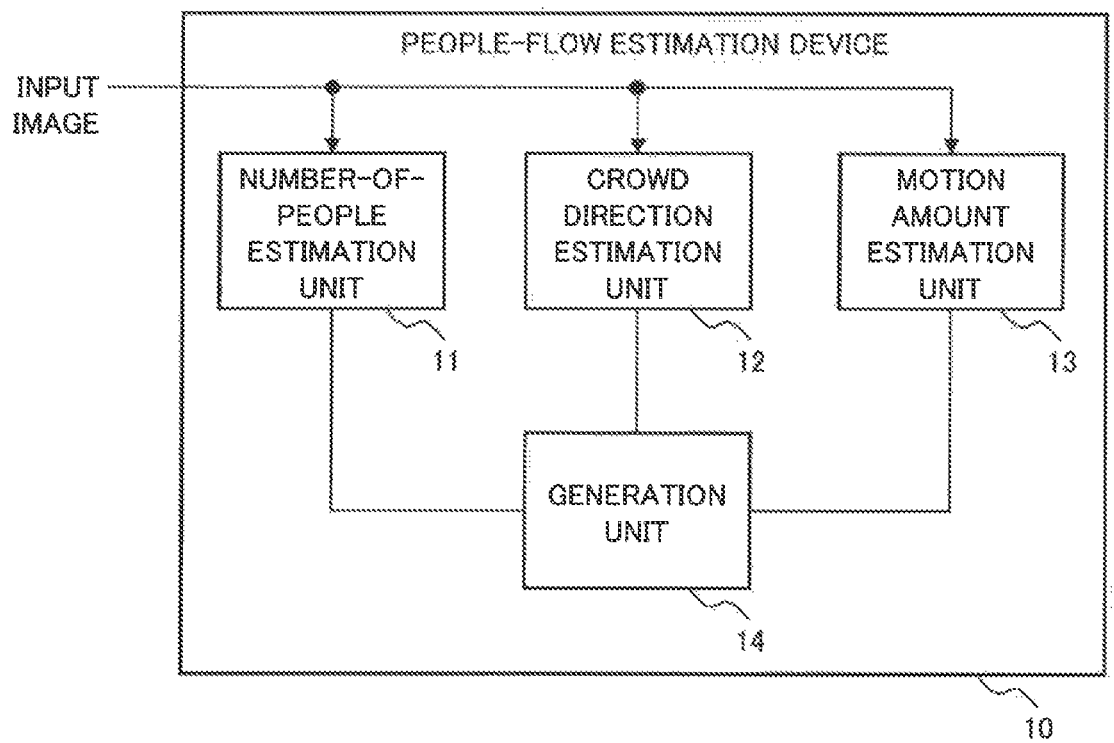
FIG. 1 is a functional block diagram illustrating one example of a functional configuration of a people-flow estimation device according to a first example embodiment.

A first example embodiment of the present disclosure is described with reference to the drawings. FIG. 1 is a functional block diagram illustrating one example of a functional configuration of a people-flow estimation device 10 according to the present example embodiment. As illustrated in FIG. 1, the people-flow estimation device 10 according to the present example embodiment includes a number-of-people estimation unit 11, a crowd direction estimation unit 12, a motion amount estimation unit 13, and a generation unit 14.

The number-of-people estimation unit 11 estimates a number of people included in a partial area of an image received in the people-flow estimation device 10 (the image is referred to as an input image). Further, the crowd direction estimation unit 12 estimates a direction of a crowd (a crowd direction) in the partial area. Moreover, the motion amount estimation unit 13 estimates a motion amount in the partial area. The number-of-people estimation unit 11, the crowd direction estimation unit 12, and the motion amount estimation unit 13 estimate a number of people, the crowd direction, and the motion amount of the crowd for each of a plurality of partial areas in the input image received in the people-flow estimation device 10, respectively. A partial area represents an area smaller than the overall area of the input image. In other words, a partial area of the input image represents an image in the small area. The number-of-people estimation unit 11, the crowd direction estimation unit 12, and the motion amount estimation unit 13 supply estimation results to the generation unit 14, respectively. In this instance, the number-of-people estimation unit 11 supplies information (e.g., an identifier) indicating a partial area, and an estimated number of people, to the generation unit 14, as the estimation results. The crowd direction estimation unit 12 supplies information indicating a partial area, and an estimated crowd direction, to the generation unit 14, as the estimation results. Moreover, the motion amount estimation unit 13 supplies information indicating a partial area, and an estimated motion amount, to the generation unit 14, as the estimation results.

Based on the number of people supplied from the number-of-people estimation unit 11, the crowd direction supplied from the crowd direction estimation unit 12, and the motion amount supplied from the motion amount estimation unit 13, the generation unit 14 generates people-flow information being information related to people-flow representing flow of people in a partial area. Specifically, the generation unit 14 extracts a partial area where a person exists, from the plurality of partial areas for each partial area, based on the number of people being an estimation result related to the partial area. Then, based on the number of people related to an extracted partial area, the extracted partial area, and a crowd direction and a motion amount related to the partial area, the generation unit 14 generates people-flow information including the number of people related to a partial area, a movement state of a person included in the partial area, and information representing an area of the person. People-flow information includes the number of people, a movement state of a person, and information representing an area of the person as described above, and can therefore be paraphrased as information expressing people-flow.

By such a configuration, the people-flow estimation device 10 according to the present example embodiment estimates people-flow for a plurality of persons included in the input image, without tracking. Consequently, the people-flow estimation device 10 according to the present example embodiment can highly accurately estimate people-flow from even the image captured under a congested environment in which overlap of people frequently occurs, and transmitted at a low frame rate.

Figure 2:
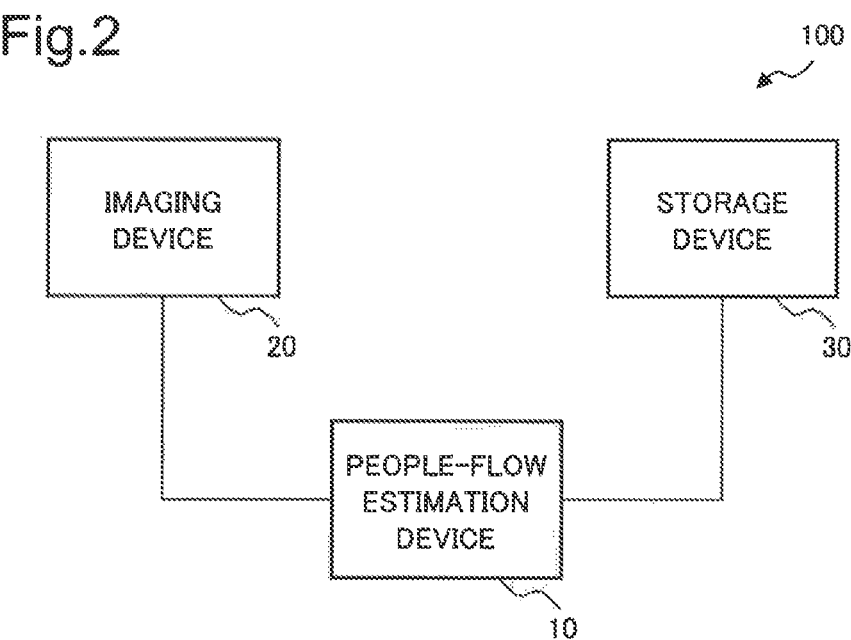
FIG. 2 is a block diagram illustrating one example of a configuration of a people-flow estimation system including the people-flow estimation device according to the first example embodiment.

The people-flow estimation device 10 according to the present example embodiment is described in further detail. First, a people-flow estimation system 100 including the people-flow estimation device 10 is described with reference to FIG. 2. As illustrated in FIG. 2, the people-flow estimation system 100 includes the people-flow estimation device 10, an imaging device 20, and a storage device 30. The people-flow estimation device 10 and the imaging device 20 are communicably connected to each other. The people-flow estimation device 10 and the storage device 30 are also communicably connected to each other. Note that the people-flow estimation device 10 may be configured to include therein the storage device 30 as a storage unit.

The imaging device 20 is achieved by a video camera or the like being capable of capturing a moving image. An image captured by the imaging device 20 is input to the people-flow estimation device 10. Note that an image captured by the imaging device 20 may be input to the people-flow estimation device 10 after saved in an unillustrated storage device or the like. In other words, the people-flow estimation device 10 acquires an image captured by the imaging device 20 from the imaging device 20 or a device in which the image is stored.

The storage device 30 is achieved by, for example, a hard disk drive or the like. A position and a size of a partial area in the input image are saved in the storage device 30 for each of the partial areas. Specifically, a position and a size of a partial area in an image are saved in the storage device 30 in association with information (referred to as partial area identifier (ID)) indicating the partial area. A position and a size of each partial area are previously determined. Typically, a position and a size of each individual partial area are determined in such a way that the whole image is covered with a plurality of partial areas. However, an aspect of determining a partial area is not limited to the above-described example. Positions and sizes of a plurality of partial areas may be determined for only an area targeted for estimation of people-flow in an image. Moreover, a position and a size of a partial area may be determined in such a way that at least one part of a partial area overlaps another partial area. Note that a size of a partial area may be previously set in accordance with functions of the number-of-people estimation unit 11 and the crowd direction estimation unit 12 described later. Hereinafter, an image of a part corresponding to a partial area in the input image is written as a partial area image.

Next, each unit in FIG. 1 is described in further detail.

The number-of-people estimation unit 11 estimates a number of people included in a partial area of the input image input to the people-flow estimation device 10. Specifically, the number-of-people estimation unit 11 estimates a number of people in a partial area, from an image captured by the imaging device 20, targeting at each partial area image in the image specified by each previously determined partial area. In other words, the number-of-people estimation unit 11 estimates a number of people for each partial area in the input image, based on a position and a size of each partial area saved in the storage device 30. The number-of-people estimation unit 11 may estimate a number of people in each partial area by use of an estimator obtained by learning. For example, an estimator which outputs a number of people in a partial area, when a partial area image is input, is previously obtained by learning. The number-of-people estimation unit 11 may find an estimated value of a number of people in a partial area by inputting a partial area image to the estimator. For learning of the estimator, it is only necessary to use a partial area image including a crowd constituted of a plurality of persons, and information about a number of people included in the partial area image. A partial area image used for learning may include an image having overlap of people. This learning is, for example, partial-area-based learning described in PTL 4. Note that a method of estimating a number of people in a partial area is not limited to the method described in PTL 4, and any other method may be used. As estimation results, the number-of-people estimation unit 11 supplies a partial area ID and an estimated number of people to the generation unit 14.

The crowd direction estimation unit 12 estimates a crowd direction in a partial area of the input image input to the people-flow estimation device 10. Specifically, the crowd direction estimation unit 12 estimates a crowd direction in a partial area, from an image captured by the imaging device 20, targeting at each partial area image in the image specified by each previously determined partial area. In other words, the crowd direction estimation unit 12 estimates a crowd direction for each partial area in the input image, based on a position and a size of each partial area saved in the storage device 30. The crowd direction estimation unit 12 may estimate a crowd direction by use of an estimator obtained by learning. For example, an estimator which outputs, when a partial area image is input, a crowd direction in the partial area image is previously obtained by learning. The crowd direction estimation unit 12 may find an estimated value of a crowd direction by inputting a partial area image to the estimator. For learning of the estimator, it is only necessary to use a partial area image including a crowd constituted of a plurality of persons in various directions, and a vector and an angle indicating a representative crowd direction in the partial area image. Moreover, for a crowd direction used for learning, a label constituted of a percentage and a direction may be used, such as "40% at 10 degrees, and 60% at 130 degrees", or "10% at 45 degrees, 20% at 20 degrees, and 30% at 90 degrees". Further, for a crowd direction used for learning, a label called a random direction may be used. In addition, a partial area image used for learning may include an image having overlap of people. This learning is, for example, partial-area-based learning described in PTL 4. Note that a method of estimating a crowd direction in a partial area is not limited to the method described in PTL 4, and any other method may be used. As estimation results, the crowd direction estimation unit 12 supplies a partial area ID and information representing an estimated crowd direction to the generation unit 14.

The motion amount estimation unit 13 estimates a motion amount in a partial area of the input image input to the people-flow estimation device 10. Specifically, the motion amount estimation unit 13 estimates a motion amount in a partial area, from an image captured by the imaging device 20, targeting at each partial area image in the image specified by each previously determined partial area. In other words, the motion amount estimation unit 13 estimates a motion amount for each partial area in the input image, based on a position and a size of each partial area saved in the storage device 30.

A scheme robust against a frame rate is used for estimation of a motion amount. The motion amount estimation unit 13 may calculate similarity in a feature amount of an image pattern, or an inter-frame difference amount, from partial area images being at different times and being at the same position in the input image. These values can be said to each represent a degree of motion in a partial area. Similarity in a feature amount of an image pattern has a property that a motion amount becomes smaller when similarity is higher. An inter-frame difference amount has a property that a motion amount becomes smaller when a value of the inter-frame difference amount is smaller. The motion amount estimation unit 13 needs only to estimate a motion amount in a partial area by use of the properties, based on the calculated value. Alternatively, the motion amount estimation unit 13 may estimate a motion amount by use of an estimator obtained by learning. For example, an estimator which outputs a motion amount in a partial area, when partial area images being at different times and being at the same position in the input image are input, is previously obtained by learning. The motion amount estimation unit 13 may find an estimated value of a motion amount in a partial area by inputting partial area images being at different times and being at the same position to the estimator. For learning of the estimator, it is only necessary to use the following (a) to (d):

(a) two partial area images at different times when an object included in a partial area is moving, (b) information representing motion in a partial area for (a), (c) two partial area images at different times when an object included in a partial area is not moving, and (d) information representing motion in a partial area for (c).

This learning is partial-area-based learning.

Furthermore, a motion sensor which detects motion of an object in a real space corresponding to a partial area may be provided, and, from a detection result of the motion sensor, the motion amount estimation unit 13 may estimate a motion amount in a partial area indicated by a partial area image. A method of estimating a motion amount in a partial area is not limited to these methods as long as the method includes a scheme robust against a frame rate, and any method may be used. As estimation results, the motion amount estimation unit 13 supplies a partial area ID and an estimated motion amount to the generation unit 14.

The generation unit 14 receives the partial area ID, and the number of people estimated by the number-of-people estimation unit 11, from the number-of-people estimation unit 11. The generation unit 14 also receives the partial area ID, and the information representing the crowd direction estimated by the crowd direction estimation unit 12, from the crowd direction estimation unit 12. The generation unit 14 also receives the partial area ID, and the motion amount estimated by the motion amount estimation unit 13, from the motion amount estimation unit 13.

Then, the generation unit 14 extracts a partial area where a person exists, from a plurality of partial areas, based on the estimated number of people. Then, based on a number of people, an extracted partial area, and a crowd direction and a motion amount related to the partial area, the generation unit 14 generates people-flow information including a number of people related to the partial area, a movement state of a person included in the partial area, and information representing an area of the person. Consequently, the people-flow estimation device 10 can output people-flow information related to people-flow.

Figure 3:
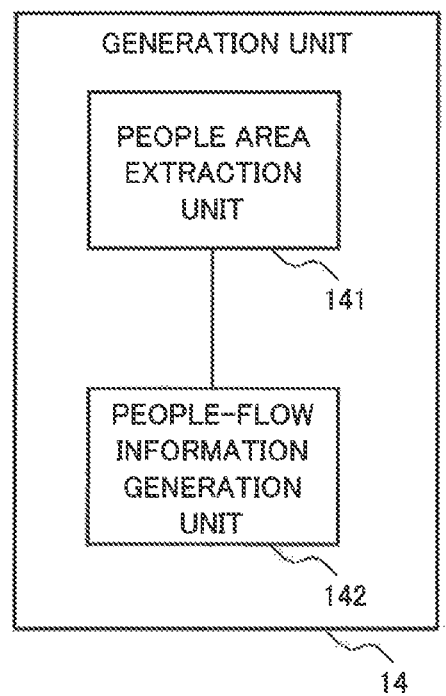
FIG. 3 is a functional block diagram illustrating one example of a functional configuration of a generation unit in the people-flow estimation device according to the first example embodiment.

A configuration of the generation unit 14 is described in further detail. FIG. 3 is a functional block diagram illustrating one example of a functional configuration of the generation unit 14 in the people-flow estimation device 10 according to the present example embodiment. As illustrated in FIG. 3, the generation unit 14 includes a people area extraction unit 141 and a people-flow information generation unit 142.

The people area extraction unit 141 obtains, as inputs, a partial area ID and an estimated number of people output by the number-of-people estimation unit 11. Based on a number of people estimated by the number-of-people estimation unit 11, the people area extraction unit 141 extracts a partial area where a person exists, from a plurality of partial areas, for each partial area. Specifically, among a plurality of partial areas, the people area extraction unit 141 extracts, as a partial area where a person exists, a partial area where an estimated number of people is more than a predetermined value. Then, the people area extraction unit 141 acquires, from the storage device 30, a position and a size of the extracted partial area in the input image. As described above, in the storage device 30, a partial area ID, and a position and a size of a partial area indicated by the partial area ID in the input image are saved in association with each other. Therefore, the people area extraction unit 141 acquires, from the storage device 30, a position and a size in the input image associated with a partial area ID of an extracted partial area.

Then, the people area extraction unit 141 supplies a partial area ID, and a number of people, a position, and a size related to a partial area ID to the people-flow information generation unit 142.

From the people area extraction unit 141, the people-flow information generation unit 142 receives a partial area ID, and a number of people, a position, and a size related to a partial area ID. Based on a number of people related to an extracted partial area, the extracted partial area, and a crowd direction and a motion amount related to the partial area, the people-flow information generation unit 142 generates people-flow information including a number of people related to a partial area, a movement state of a person included in the partial area, and information representing an area of the person.

Specifically, the people-flow information generation unit 142 receives an estimation result including a partial area ID, and information representing a crowd direction from the crowd direction estimation unit 12. The people-flow information generation unit 142 also receives an estimation result including a partial area ID, and a motion amount from the motion amount estimation unit 13. From the estimation result received from the crowd direction estimation unit 12, the people-flow information generation unit 142 extracts information representing a crowd direction associated with the same partial area ID as the partial area ID received from the people area extraction unit 141.

Moreover, from the estimation result received from the motion amount estimation unit 13, the people-flow information generation unit 142 extracts a motion amount associated with the same partial area ID as the partial area ID received from the people area extraction unit 141. Then, based on the extracted motion amount, the people-flow information generation unit 142 determines whether motion is present in the crowd. Specifically, when a motion amount is more than a predetermined value, the people-flow information generation unit 142 determines that motion is present in the crowd included in a partial area related to the motion amount. When a motion amount is less than or equal to a predetermined value, the people-flow information generation unit 142 determines that motion is absent in the crowd included in a partial area related to the motion amount. Based on a determined result, the people-flow information generation unit 142 generates information representing presence or absence of crowd motion.

Furthermore, for each partial area, the people-flow information generation unit 142 regards information representing a crowd direction related to a partial area, and information representing presence or absence of crowd motion, as a movement state of a person included in the partial area. The people-flow information generation unit 142 also regards, as information representing an area of a person, a position and a size of the partial area in the input image received from the people area extraction unit 141. Then, for each partial area, the people-flow information generation unit 142 generates people-flow information including a number of people related to a partial area received from the people area extraction unit 141, a movement state of a person included in the partial area, and information representing an area of the person.

Figure 4:
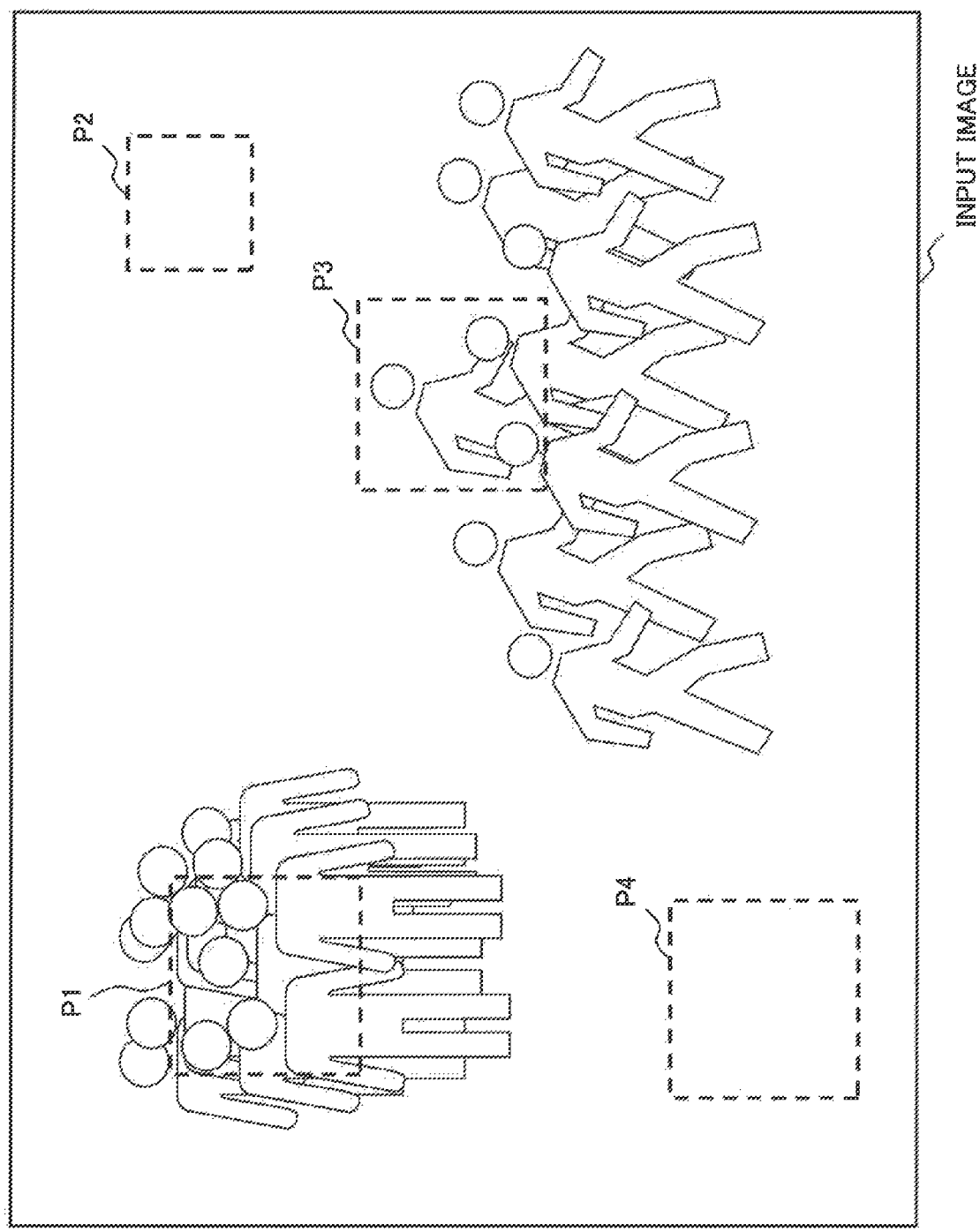
FIG. 4 is a view illustrating one example of an input image.

FIG. 4 is a view illustrating one example of the input image. Herein, it is assumed that four partial areas P1 to P4 are previously determined. In addition, the partial areas P1 to P4 are expressed by rectangular areas on the input image illustrated in FIG. 4. In FIG. 4, the partial area P1 includes a crowd of five people looking in a downward direction of a screen and remaining unmoving, and the partial area P3 includes a crowd of three people moving to the right of the screen. Moreover, the partial area P2 and the partial area P4 are areas where no crowd exist.

FIG. 5 is a diagram in which information related to a partial area is described for each partial area ID indicating a partial area. In FIG. 5, a partial area ID representing the partial area P1 is IDP1. Similarly, in FIG. 5, a partial area ID of the partial area P2 is IDP2, a partial area ID of the partial area P3 is IDP3, and a partial area ID of the partial area P4 is IDP4. A number of people illustrated in FIG. 5 is a number of people related to each partial area ID, and is a number of people estimated by the number-of-people estimation unit 11 for a partial area indicated by the partial area ID. Moreover, an area of a person illustrated in FIG. 5 is information having a position and a size of a partial area indicated by a partial area ID in the input image, and representing a partial area saved in the storage device 30. In the example of FIG. 5, a position of a partial area is expressed by an upper left coordinate of a rectangular area indicated by a partial area with a broken-line frame in FIG. 4, and a size of a partial area is expressed by a number of vertical and horizontal pixels. However, a method of expressing a position and a size of a partial area is not limited to this, and any method may be used.

Furthermore, a crowd direction included in a movement state of a person illustrated in FIG. 5 represents a crowd direction included in a partial area indicated by a partial area ID, and is a direction estimated by the crowd direction estimation unit 12 for the partial area. Moreover, presence or absence of crowd motion included in a movement state of a person illustrated in FIG. 5 represents presence or absence of crowd motion determined by the people-flow information generation unit 142, based on a motion amount estimated by the motion amount estimation unit 13. "Presence" indicates that motion is present in a crowd included in a partial area, and "absence" indicates that motion is absent in a crowd included in a partial area.

The people-flow information generation unit 142 generates, as people-flow information, a number of people, a position and a size of a partial area being information representing an area of a person, and a movement state of a person, which are associated with the partial area ID "IDP1". Similarly, the people-flow information generation unit 142 generates, as people-flow information, a number of people, a position and a size of a partial area being information representing an area of a person, and a movement state of the person, which are associated with the partial area ID "IDP3".

Figure 6:
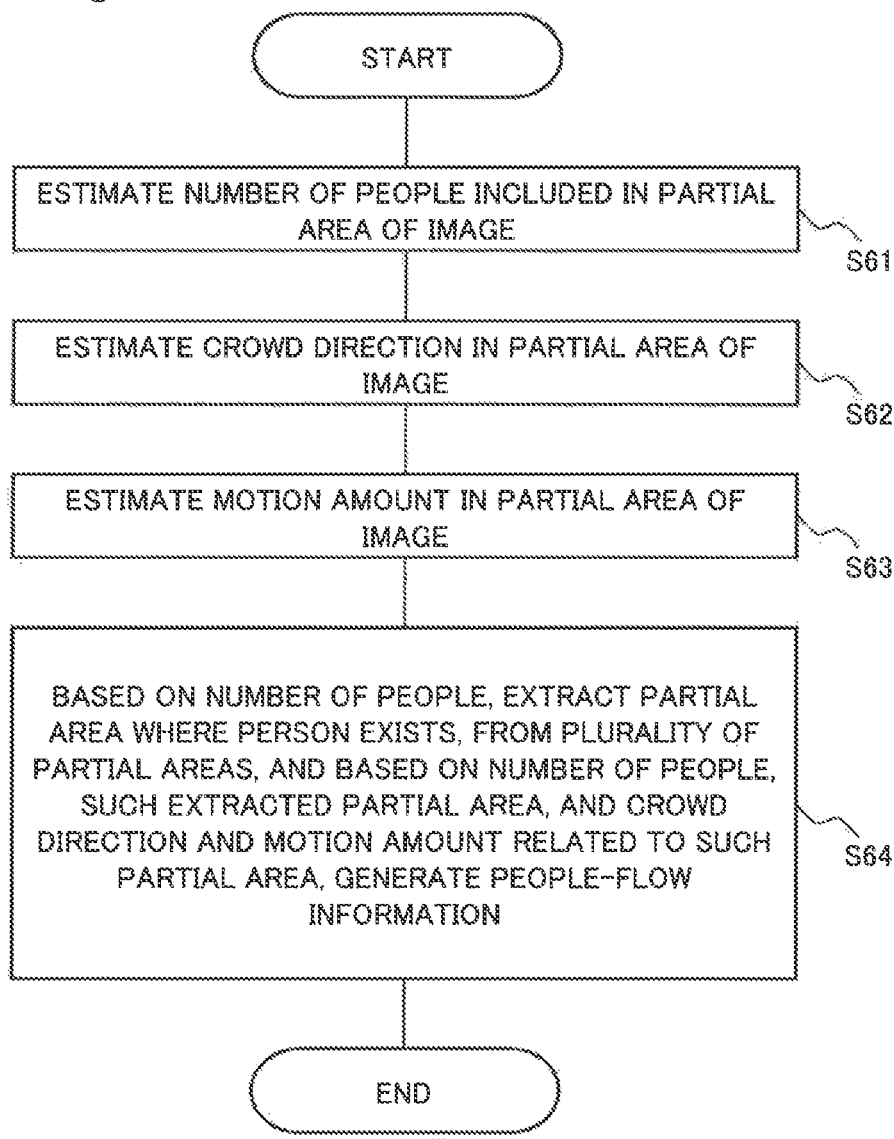
FIG. 6 is a flowchart illustrating one example of an operation of the people-flow estimation device according to the first example embodiment.
Figure 7:
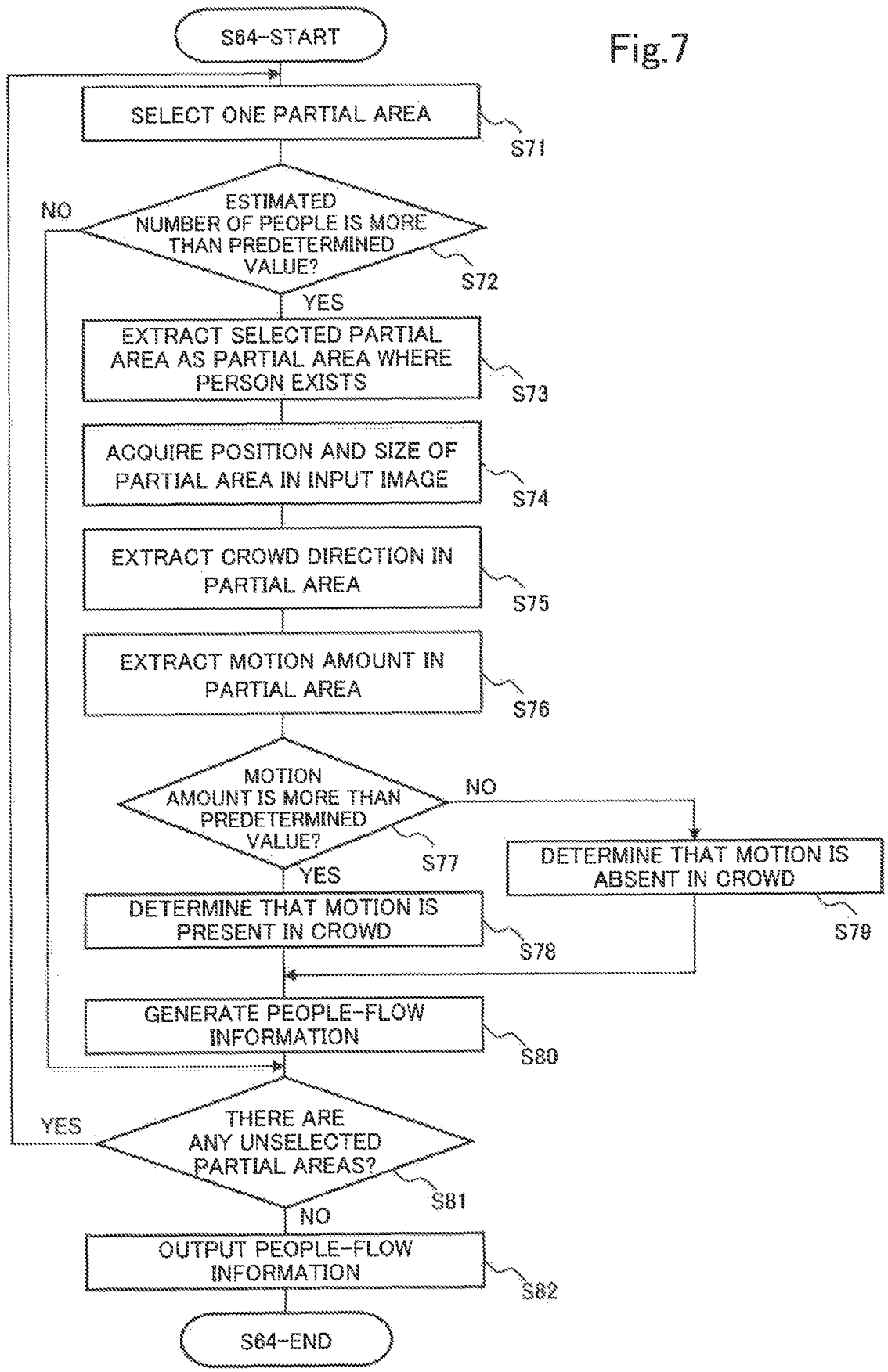
FIG. 7 is a flowchart illustrating one example of an operation of the generation unit of the people-flow estimation device according to the first example embodiment.

Next, an operation of the people-flow estimation device 10 according to the present example embodiment is described with reference to FIGS. 6 and 7. FIG. 6 is a flowchart illustrating one example of an operation of the people-flow estimation device 10 according to the present example embodiment. In the flowchart illustrated in FIG. 6, a description is given assuming that an image captured by the imaging device 20 is input to the people-flow estimation device 10.

As illustrated in FIG. 6, in the people-flow estimation device 10 according to the present example embodiment, the number-of-people estimation unit 11 estimates a number of people included in a partial area of an image which is input (step S61). Moreover, the crowd direction estimation unit 12 estimates a crowd direction in a partial area of an image which is input (step S62). Further, the motion amount estimation unit 13 estimates a motion amount in a partial area of an image which is input (step S63). The step S61 to the step S63 are performed for each of a plurality of partial areas included in an image which is input. In addition, the step S61 to the step S63 may be performed in any order.

After end of the step S61 to the step S63, the generation unit 14 extracts a partial area where a person exists, from a plurality of partial areas, based on a number of people. Then, based on a number of people, the extracted partial area, and a crowd direction and a motion amount related to the partial area, the generation unit 14 generates people-flow information being information regarding people-flow representing flow of people in the partial area (step S64). The people-flow information includes a number of people related to a partial area, a movement state of a person included in the partial area, and information representing an area of the person.

Accordingly, the people-flow estimation device 10 ends the processing.

Herein, processing in the step S64 is described in further detail. FIG. 7 is a flowchart illustrating one example of an operation of the generation unit 14 according to the present example embodiment. As illustrated in FIG. 7, the people area extraction unit 141 of the generation unit 14 selects one partial area where a number of people is estimated by the number-of-people estimation unit 11, among a plurality of partial areas (step S71). Then, the people area extraction unit 141 determines, for the selected partial area, whether the number of people estimated by the number-of-people estimation unit 11 in the step S61 is more than a predetermined value (step S72). When the estimated number of people is less than or equal to the predetermined value (NO in the step S72), the generation unit 14 proceeds the processing to a step S81.

When the estimated number of people is more than the predetermined value (YES in the step S72), the people area extraction unit 141 extracts this partial area as a partial area where a person exists (step S73). Then, the people area extraction unit 141 acquires a position and a size of the extracted partial area in the input image, from the storage device 30 (step S74). Then, the people-flow information generation unit 142 extracts a crowd direction estimated for the partial area extracted in the step S73, from a crowd direction in each of a plurality of partial areas estimated by the crowd direction estimation unit 12 in the step S62 (step S75). The people-flow information generation unit 142 also extracts a motion amount estimated for the partial area extracted in the step S73, from a motion amount in each of a plurality of partial areas estimated by the motion amount estimation unit 13 in the step S63 (step S76).

The people-flow information generation unit 142 determines whether the motion amount extracted in the step S76 is more than a predetermined value (step S77). When the motion amount is more than the predetermined value (YES in the step S77), the people-flow information generation unit 142 determines that motion is present in the crowd included in a partial area related to the motion amount (step S78). Contrarily, when the motion amount is less than or equal to the predetermined value (NO in the step S77), the people-flow information generation unit 142 determines that motion is absent in the crowd included in a partial area related to the motion amount (step S79).

Note that the step S75 may be performed after the step S76 to the step S79, or may be performed simultaneously with the processing in the step S76 to the step S79.

Then, the people-flow information generation unit 142 generates people-flow information including a number of people, a movement state of a person included in the partial area, and information representing an area of the person, for the partial area selected in the step S71 (step S80). As described above, a movement state of a person includes information representing the crowd direction extracted in the step S75, and information representing presence or absence of crowd motion determined in the step S78 or the step S79. Moreover, information representing an area of the person includes the position and size of the partial area acquired in the step S74.

Then, the generation unit 14 determines whether there are any unselected partial areas among a plurality of partial areas (step S81). When there are unselected partial areas (YES in the step S81), the generation unit 14 returns the processing to the step S71. Then, the people area extraction unit 141 again selects one partial area from the unselected partial areas, among a plurality of partial areas (step S71). When there are no unselected partial areas (NO in the step S81), the generation unit 14 outputs people-flow information for each partial area generated in the step S80 (step S82).

Accordingly, the generation unit 14 ends the processing in the step S64.

Advantageous Effect

As described above, the people-flow estimation device 10 according to the present example embodiment estimates a number of people included in a partial area of the input image, a crowd direction in the partial area, and a motion amount in the partial area. Based on the estimated number of people, the people-flow estimation device 10 extracts a partial area where a person exists, from a plurality of partial areas. Then, based on the extracted partial area, and a crowd direction and a motion amount related to the partial area, the people-flow estimation device 10 generates people-flow information including a number of people related to the partial area, a movement state of a person included in the partial area, and information representing an area of the person. In this way, the people-flow estimation device 10 according to the present example embodiment estimates people-flow for a plurality of persons included in the input image, without tracking. Consequently, the people-flow estimation device 10 according to the present example embodiment can robustly estimate people-flow from even the image captured under a congested environment in which overlap of people frequently occurs, and transmitted at a low frame rate.

Furthermore, according to the people-flow estimation device 10 in the present example, the number-of-people estimation unit 11 estimates, for each partial area included in the input image, a number of people included in the partial area. Moreover, the crowd direction estimation unit 12 estimates, for each partial area included in the input image, a crowd direction in the partial area. By use of partial-area-based learning which enables learning including overlap of people, the number-of-people estimation unit 11 and the crowd direction estimation unit 12 estimate information about a number of people and a crowd direction necessary for estimation of people-flow, from one image which is not affected by a frame rate. Consequently, the people-flow estimation device 10 can more robustly estimate a number of people and a crowd direction in a partial area from even the image captured under a congested environment in which overlap of people frequently occurs, and transmitted at a low frame rate.

Still further, according to the people-flow estimation device 10 in the present example, the motion amount estimation unit 13 estimates a motion amount for each partial area included in the input image, by use of partial-area-based learning and estimation robust against a frame rate. Then, the generation unit 14 determines, by use of the estimated motion amount, whether motion is present in the crowd in the partial area, and thereby converts the motion amount into information representing presence or absence of motion which is not relatively dependent on a frame rate. Then, the generation unit 14 generates people-flow information including a movement state of a person regarding presence or absence of crowd motion. Consequently, the people-flow estimation device 10 can more robustly estimate people-flow from even the image captured under a congested environment and transmitted at a low frame rate.

For example, according to the people-flow estimation device 10 in the present example, it can be recognized that a crowd of five people are included in the partial area P1 illustrated in FIG. 4, and are looking in a downward direction and remaining unmoving. Thus, it can be estimated that the crowd is interested in the downward direction. By estimating people-flow in this way, the people-flow estimation device 10 can inform, for example, a manager of the people-flow estimation device 10 of how many people there are, which area the people are in, and which direction and what way the people are moving in.

Furthermore, the generation unit 14 of the people-flow estimation device 10 according to the present example embodiment extracts, as a partial area where a person exists, a partial area where a number of people estimated by the number-of-people estimation unit 11 is more than a predetermined value, and generates people-flow information for the extracted partial area. Thus, the people-flow estimation device 10 can output, for example, people-flow information of a crowd including people equal to or more than a number of people desired by a user of the people-flow estimation device 10.

Note that a person is described as a target in the present example embodiment, but a person may be replaced with a certain object.

Modification Example

Next, a modification example of the present example embodiment is described. In the above-described first example embodiment, it is described that the crowd direction estimation unit 12 and the motion amount estimation unit 13 estimate a crowd direction and a motion amount for all partial areas. However, the crowd direction estimation unit 12 and the motion amount estimation unit 13 may be configured to estimate a crowd direction and a motion amount for only a partial area where more people exist than a predetermined number of people. In the present modification example, processing of the people-flow estimation device 10, when the crowd direction estimation unit 12 and the motion amount estimation unit 13 are configured to estimate a crowd direction and a motion amount for only a partial area where a person exists, is described.

Figure 8:
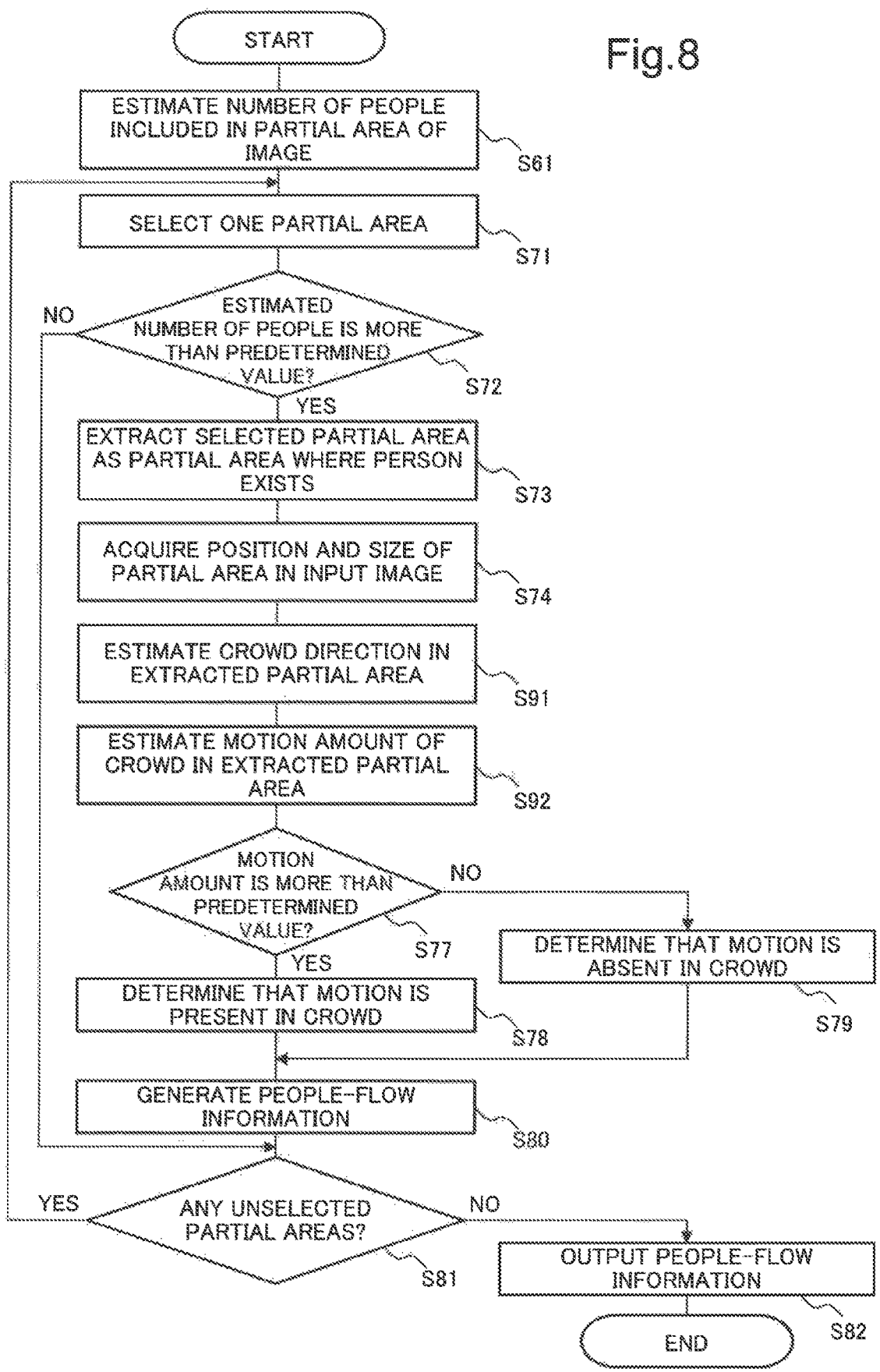
FIG. 8 is a flowchart illustrating one example of an operation of a people-flow estimation device according to a modification example of the first example embodiment.

FIG. 8 is a flowchart illustrating one example of processing flow of the people-flow estimation device 10 according to the modification example. Note that the same reference signs are given to the same processing as the processing illustrated in FIGS. 6 and 7, and a detailed description thereof is omitted.

As illustrated in FIG. 8, in the people-flow estimation device 10 according to the present modification example, the number-of-people estimation unit 11 estimates a number of people included in a partial area of an image which is input (step S61). As estimation results, the number-of-people estimation unit 11 supplies a partial area ID and an estimated number of people to the generation unit 14.

The people area extraction unit 141 of the generation unit 14 selects one partial area where a number of people is estimated by the number-of-people estimation unit 11, among a plurality of partial areas (step S71). Then, the people area extraction unit 141 determines, for the selected partial area, whether the number of people estimated by the number-of-people estimation unit 11 in the step S61 is more than a predetermined value (step S72). When the estimated number of people is less than or equal to the predetermined value (NO in the step S72), the generation unit 14 proceeds the processing to the step S81.

When the estimated number of people is more than the predetermined value (YES in the step S72), the people area extraction unit 141 extracts this partial area as a partial area where a person exists (step S73). Then, the people area extraction unit 141 also acquires a position and a size of the extracted partial area in the input image, from the storage device 30 (step S74).

Then, the crowd direction estimation unit 12 estimates a crowd direction in the partial area extracted by the people area extraction unit 141 in the step S73 (step S91). Moreover, the motion amount estimation unit 13 estimates a motion amount of the crowd in the partial area extracted by the people area extraction unit 141 in the step S73 (step S92).

Then, the people-flow information generation unit 142 determines whether the motion amount extracted in the step S92 is more than a predetermined value (step S77). When the motion amount is more than the predetermined value (YES in the step S77), the people-flow information generation unit 142 determines that motion is present in the crowd included in a partial area related to the motion amount (step S78). Contrarily, when the motion amount is less than or equal to the predetermined value (NO in the step S77), the people-flow information generation unit 142 determines that motion is absent in the crowd included in a partial area related to the motion amount (step S79). Note that the step S91 may be performed after the step S92 and the step S77 to the step S79, or may be performed simultaneously with the processing in the step S92 and the step S77 to the step S79.

Then, the people-flow information generation unit 142 generates people-flow information including a number of people, a movement state of a person included in the partial area, and information representing an area of the person, for the partial area selected in the step S71 (step S80). A movement state of a person includes information representing the crowd direction estimated in the step S91, and information representing presence or absence of crowd motion determined in the step S78 or the step S79. Moreover, information representing an area of the person includes the position and size of the partial area acquired in the step S74.

Then, the generation unit 14 determines whether there are any unselected partial areas among a plurality of partial areas where numbers of people is estimated (step S81). When there are unselected partial areas (YES in the step S81), the generation unit 14 returns the processing to the step S71. Then, the people area extraction unit 141 again selects one partial area from the unselected partial areas, among a plurality of partial areas (step S71). When there are no unselected partial areas (NO in the step S81), the generation unit 14 outputs people-flow information for each partial area generated in the step S80 (step S82).

Accordingly, the people-flow estimation device 10 according to the present modification example ends the processing.

As described above, the crowd direction estimation unit 12 and the motion amount estimation unit 13 estimate a crowd direction and a motion amount for a partial area where people more than a predetermined number of people are included by the people area extraction unit 141. Thus, estimation processing for a partial area including people less than or equal to a predetermined number of people is not performed, and therefore, it is possible to reduce a processing amount for estimation processing in comparison with the people-flow estimation device 10 according to the first example embodiment.

Second Example Embodiment

Figure 9:
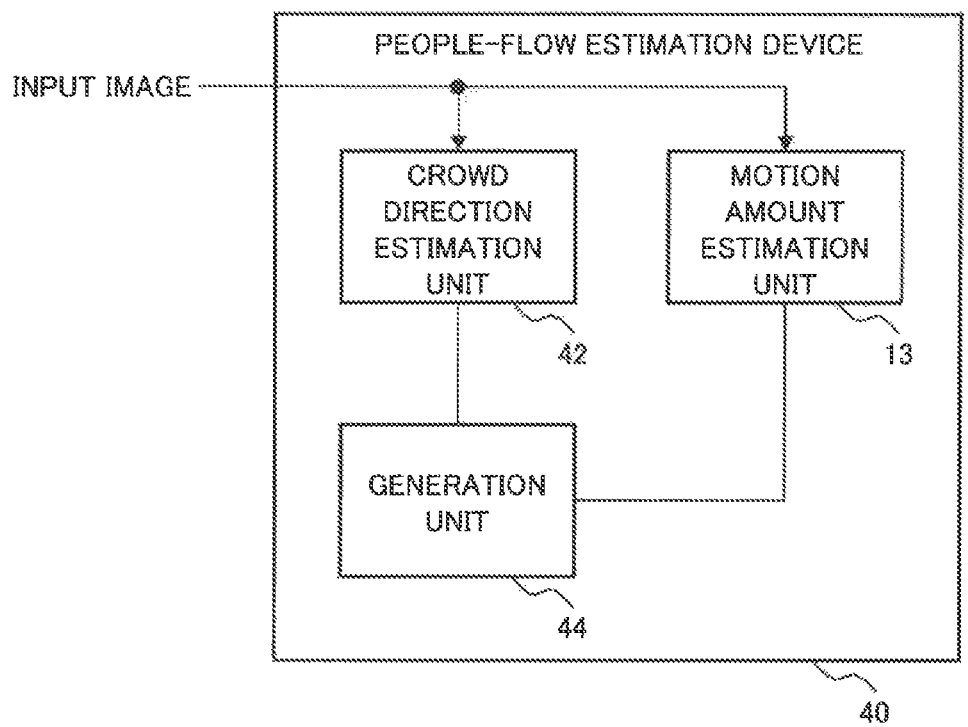
FIG. 9 is a functional block diagram illustrating one example of a functional configuration of a people-flow estimation device according to a second example embodiment.

Next, a second example embodiment is described in detail with reference to the drawings. FIG. 9 is a diagram illustrating one example of a functional configuration of a people-flow estimation device 40 according to the present example embodiment. Note that a people-flow estimation system 100 including the people-flow estimation device 40 according to the present example embodiment is configured to include the people-flow estimation device 40 instead of the people-flow estimation device 10 of the people-flow estimation system 100 described by use of FIG. 2, and has a similar configuration in other respects. Therefore, a description thereof is omitted. Note that the same reference signs are given to members similar to members described in the above-described first example embodiment for convenience of description, and a description thereof is omitted.

As illustrated in FIG. 9, the people-flow estimation device 40 according to the present example embodiment includes a crowd direction estimation unit 42, a motion amount estimation unit 13, and a generation unit 44. In contrast to the people-flow estimation device 10 according to the first example embodiment described above, the people-flow estimation device 40 according to the present example embodiment includes the crowd direction estimation unit 42 instead of a crowd direction estimation unit 12, includes the generation unit 44 instead of a generation unit 14, and does not include a number-of-people estimation unit 11.

The crowd direction estimation unit 42 estimates a crowd direction in a partial area of the input image input to the people-flow estimation device 40, and calculates reliability corresponding to the direction. The crowd direction estimation unit 42 supplies information indicating a partial area where a crowd direction is estimated, the estimated crowd direction, and the calculated reliability, to the generation unit 44.

In a way similar to the motion amount estimation unit 13 of the people-flow estimation device 10 according to the first example embodiment, the motion amount estimation unit 13 estimates a motion amount in a partial area of the input image. The motion amount estimation unit 13 supplies information indicating a partial area where a motion amount is estimated, and the estimated motion amount, to the generation unit 44.

Based on a crowd direction and reliability corresponding to the direction supplied from the crowd direction estimation unit 42, and a motion amount supplied from the motion amount estimation unit 13, the generation unit 44 generates people-flow information being information regarding people-flow representing flow of people in the partial area. For example, the generation unit 44 generates people-flow information including a movement state of a person including a crowd direction and a motion amount, and information representing an area of the person.

By such a configuration, the people-flow estimation device 40 according to the present example embodiment estimates people-flow, without tracking. Consequently, the people-flow estimation device 40 according to the present example embodiment can highly accurately estimate people-flow from even the image captured under a congested environment in which overlap of people frequently occurs, and transmitted at a low frame rate.

The people-flow estimation device 40 according to the present example embodiment is described in further detail. The crowd direction estimation unit 42 estimates a crowd direction in a partial area of the input image input to the people-flow estimation device 40. Specifically, the crowd direction estimation unit 42 estimates a crowd direction in a partial area from an image captured by the imaging device 20, targeting at each partial area image in the image specified by each previously determined partial area. In other words, the crowd direction estimation unit 42 estimates a crowd direction for each partial area in the input image, based on a position and a size of each partial area saved in a storage device 30. The estimation of a crowd direction is similar to that by the above-described crowd direction estimation unit 12.

Furthermore, the crowd direction estimation unit 42 calculates reliability of an estimated crowd direction. The reliability of a crowd direction represents a degree of reliability of an estimated crowd direction, and has a higher value when reliability is higher. For example, when there are no people in a partial area, calculated reliability becomes lower. Accordingly, it can be recognized that, when reliability is lower in value, a related partial area includes no people, and when reliability is higher in value, a related partial area includes people.

For example, in the present example embodiment, an estimator which outputs, as a crowd direction in a partial area, a vector indicating a crowd direction and representing reliability of a direction by magnitude is previously obtained by regression learning. The crowd direction estimation unit 42 estimates a crowd direction by inputting a partial area image to the estimator. Since an estimation result of a crowd direction is obtained as the above-described vector, the crowd direction estimation unit 42 can obtain reliability of a crowd direction from magnitude of a vector. The crowd direction estimation unit 42 needs only to output, as reliability, such a numerical value as to be higher as the numerical value comes closer to learned magnitude of a vector.

Alternatively, for example, an estimator which outputs, when a partial area image is input, an angle indicating a crowd direction, as a crowd direction in the partial area image, may be previously obtained by regression learning. The crowd direction estimation unit 42 estimates a crowd direction by inputting a partial area image to the estimator. Since an estimation result of a crowd direction is obtained as a numerical value of an angle, the crowd direction estimation unit 42 can obtain reliability of a crowd direction from a numerical value of an angle. The crowd direction estimation unit 42 needs only to output, as reliability, such a numerical value as to be higher as the numerical value comes closer to a range of 0 to 360 degrees.

Alternatively, for example, an estimator which outputs, when a partial area image is input, probability corresponding to an angle indicating a crowd direction, as a crowd direction in the partial area image for each of angles (e.g., every 10 degrees) at predetermined intervals, may be previously obtained by discrimination learning. The crowd direction estimation unit 42 obtains probability corresponding to an angle, for each of angles at predetermined intervals, by inputting a partial area image to the estimator. The crowd direction estimation unit 42 estimates an angle having highest probability as a crowd direction. Since an estimation result of a crowd direction is obtained as probability of an angle, the crowd direction estimation unit 42 can obtain reliability of a crowd direction from probability. The crowd direction estimation unit 42 needs only to output, as reliability, such a numerical value as to be high when probability of an angle is high at an angle estimated to be a crowd direction, and probability of an angle is low at another angle, and to be low when probability has substantially the same value at any angle. Note that a method of estimating reliability of a crowd direction is not limited to the above-described example.

The generation unit 44 receives a partial area ID, information representing a crowd direction estimated by the crowd direction estimation unit 42, and reliability, from the crowd direction estimation unit 42. The generation unit 44 also receives a partial area ID, and a motion amount estimated by the motion amount estimation unit 13, from the motion amount estimation unit 13.

Then, based on reliability, the generation unit 44 extracts a partial area where a person exists, from a plurality of partial areas. In other words, the generation unit 44 extracts a partial area where a person exists, from a plurality of partial areas, based on a position and a size of each partial area saved in the storage device 30, and reliability related to each partial area in the input image. Then, based on an extracted partial area, and a crowd direction and a motion amount related to the partial area, the generation unit 44 generates people-flow information including a movement state of a person included in the partial area, and information representing an area of the person. Consequently, the people-flow estimation device 40 can output people-flow information related to people-flow.

Figure 10:
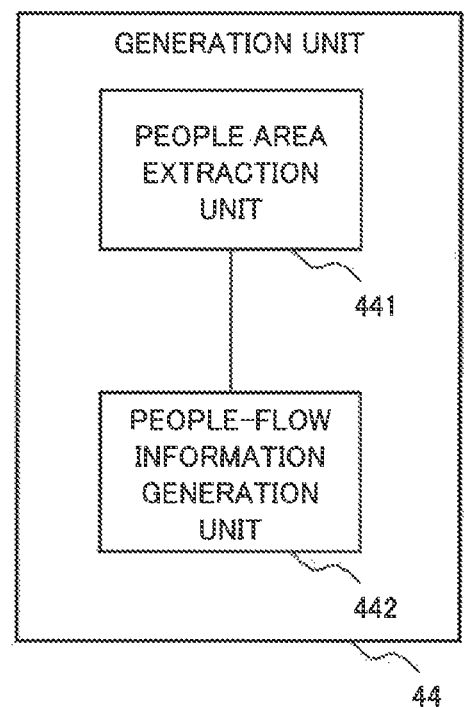
FIG. 10 is a functional block diagram illustrating one example of a functional configuration of a generation unit in the people-flow estimation device according to the second example embodiment.

A configuration of the generation unit 44 is described in further detail. FIG. 10 is a functional block diagram illustrating one example of a functional configuration of the generation unit 44 in the people-flow estimation device 40 according to the present example embodiment. As illustrated in FIG. 10, the generation unit 44 includes a people area extraction unit 441 and a people-flow information generation unit 442.

The people area extraction unit 441 obtains, as inputs, a partial area ID and reliability output by the crowd direction estimation unit 42. Based on reliability, the people area extraction unit 441 extracts a partial area where a person exists, from a plurality of partial areas, for each partial area. Specifically, among a plurality of partial areas, the people area extraction unit 441 extracts, as a partial area where a person exists, a partial area where reliability is higher than a predetermined value. Then, the people area extraction unit 441 acquires a position and a size of the extracted partial area in the input image from the storage device 30. As described above, in the storage device 30, a partial area ID, and a position and a size of a partial area indicated by the partial area ID in the input image are saved in association with each other. Therefore, the people area extraction unit 441 acquires, from the storage device 30, a position and a size in the input image associated with a partial area ID of an extracted partial area.

Then, the people area extraction unit 441 supplies a partial area ID, and a position and a size related to a partial area ID, to the people-flow information generation unit 442.

From the people area extraction unit 441, the people-flow information generation unit 442 receives a partial area ID, and a position and a size related to a partial area ID. Based on an extracted partial area, and a crowd direction and a motion amount related to the partial area, the people-flow information generation unit 442 generates people-flow information including a movement state of a person included in the partial area, and information representing an area of the person. In this way, people-flow information generated by the people-flow information generation unit 442 is configured as a form which does not include a number of people related to a partial area, in contrast to people-flow information generated by the people-flow information generation unit 142. Information representing a movement state of a person and an area of the person included in a partial area, included in people-flow information generated by the people-flow information generation unit 442, is similar to information representing a movement state of a person and an area of the person included in a partial area, included in people-flow information generated by the people-flow information generation unit 142.

Figure 11:
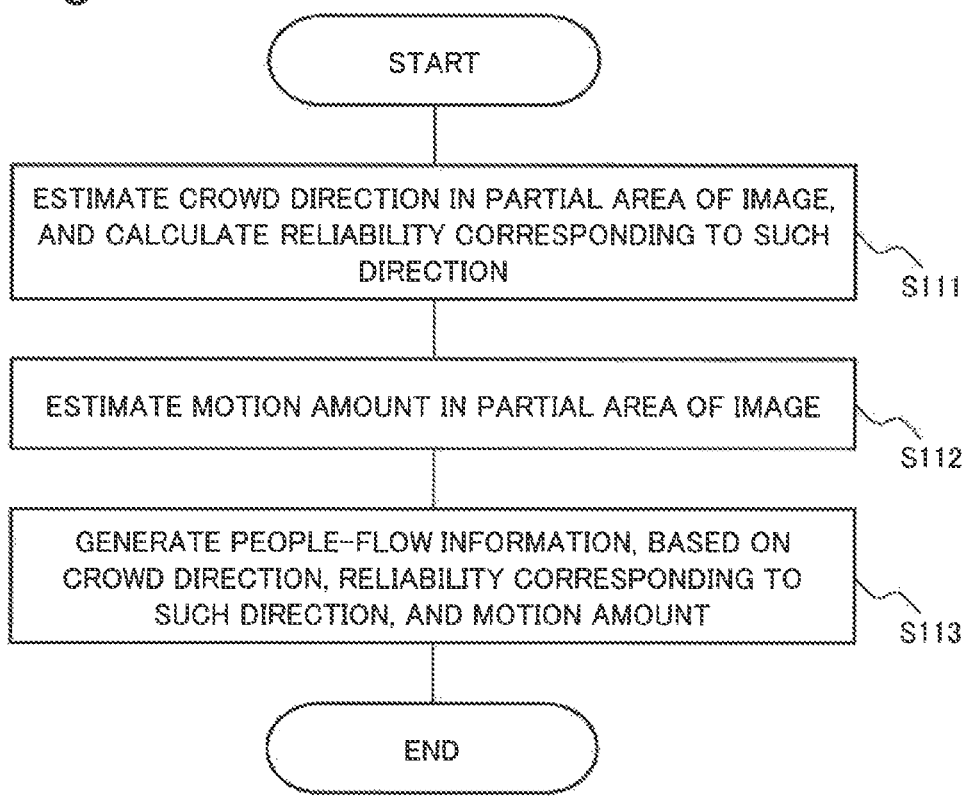
FIG. 11 is a flowchart illustrating one example of an operation of the people-flow estimation device according to the second example embodiment.
Figure 12:
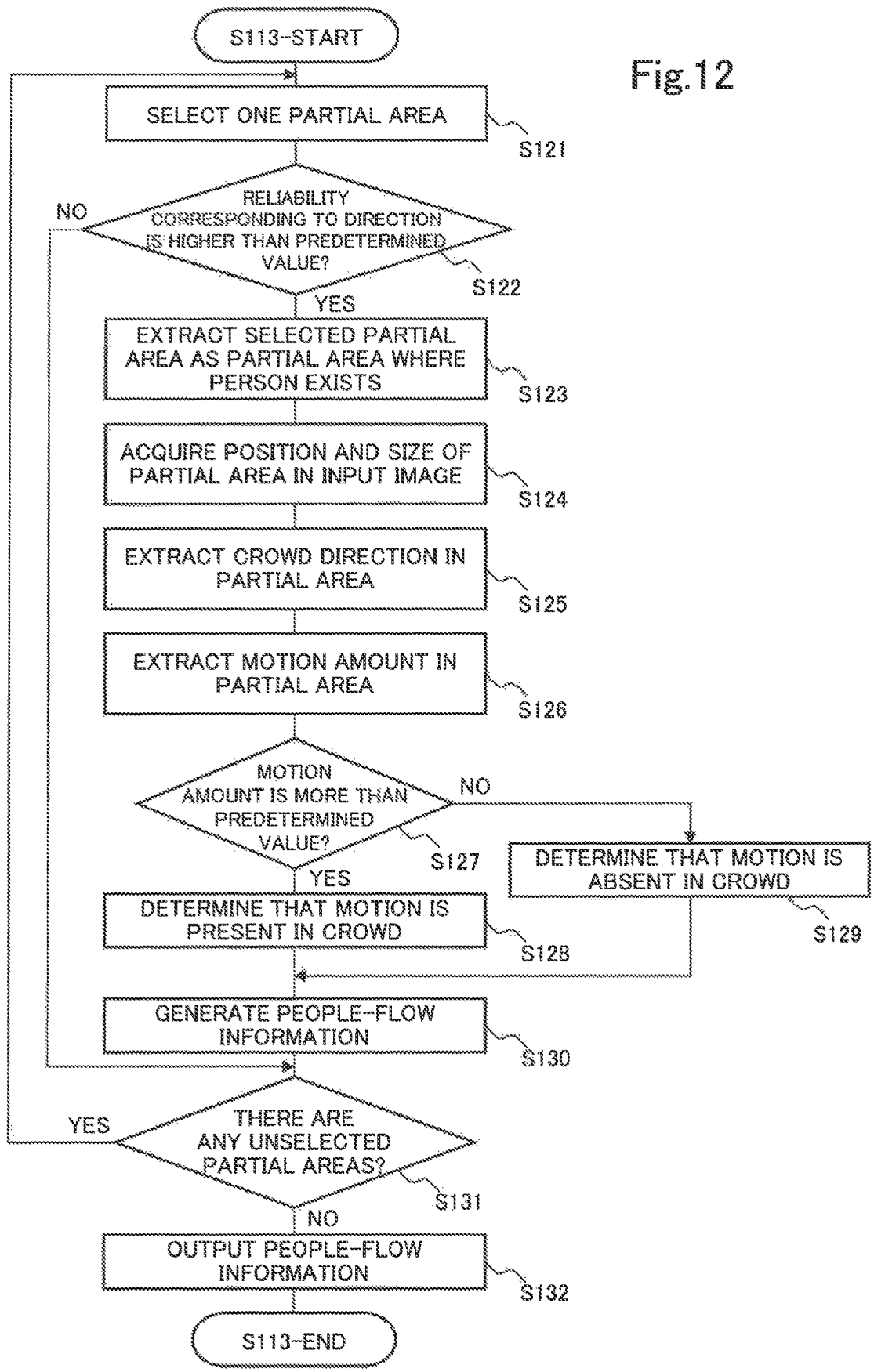
FIG. 12 is a flowchart illustrating one example of an operation of the generation unit of the people-flow estimation device according to the second example embodiment.

Next, an operation of the people-flow estimation device 40 according to the present example embodiment is described with reference to FIGS. 11 and 12. FIG. 11 is a flowchart illustrating one example of an operation of the people-flow estimation device 40 according to the present example embodiment. In the flowchart illustrated in FIG. 11, a description is given assuming that an image captured by the imaging device 20 is input to the people-flow estimation device 40.

As illustrated in FIG. 11, in the people-flow estimation device 40 according to the present example embodiment, the crowd direction estimation unit 42 estimates a crowd direction in a partial area of an image which is input, and calculates reliability corresponding to the direction (step S111). Further, the motion amount estimation unit 13 estimates a motion amount in a partial area of an image which is input (step S112). The step S111 and the step S112 are performed for each of a plurality of partial areas included in an image which is input. In addition, the step S111 and the step S112 may be performed in reverse order, or may be simultaneously performed.

After end of the step S111 and the step S112, the generation unit 44 generates people-flow information being information regarding people-flow representing flow of people in the partial area, based on a crowd direction, reliability corresponding to a direction, and a motion amount (step S113). The people-flow information includes a movement state of a person included in a partial area, and information representing an area of the person.

Accordingly, the people-flow estimation device 40 ends the processing.

Herein, processing in the step S113 is described in further detail. FIG. 12 is a flowchart illustrating one example of an operation of the generation unit 44 according to the present example embodiment. As illustrated in FIG. 12, the people area extraction unit 441 of the generation unit 44 selects one partial area from a plurality of partial areas (step S121). Then, the people area extraction unit 441 determines, for the selected partial area, whether reliability, calculated by the crowd direction estimation unit 42 in the step S111, corresponding to a direction related to the selected partial area is higher than a predetermined value (step S122). When the reliability corresponding to a direction is less than or equal to the predetermined value (NO in the step S122), the generation unit 44 proceeds the processing to the step S131.

When the reliability corresponding to a direction is higher than the predetermined value (YES in the step S122), the people area extraction unit 441 extracts this partial area as a partial area where a person exists (step S123). Then, the people area extraction unit 441 acquires a position and a size of the extracted partial area in the input image, from the storage device 30 (step S124). Then, the people-flow information generation unit 442 extracts a crowd direction estimated for the partial area extracted in the step S123, from a crowd direction in each of a plurality of partial areas estimated by the crowd direction estimation unit 42 in the step S111 (step S125). The people-flow information generation unit 442 also extracts a motion amount estimated for the partial area extracted in the step S123, from a motion amount in each of a plurality of partial areas estimated by the motion amount estimation unit 13 in the step S112 (step S126).

The people-flow information generation unit 442 determines whether the motion amount extracted in the step S126 is more than a predetermined value (step S127). When the motion amount is more than the predetermined value (YES in the step S127), the people-flow information generation unit 442 determines that motion is present in the crowd included in a partial area related to the motion amount (step S128). Contrarily, when the motion amount is less than or equal to the predetermined value (NO in the step S127), the people-flow information generation unit 442 determines that motion is absent in the crowd included in a partial area related to the motion amount (step S129).

Note that the step S125 may be performed after the step S126 to the step S129, or may be performed simultaneously with the processing in the step S126 to the step S129.

Then, the people-flow information generation unit 442 generates people-flow information including information representing a movement state of a person and an area of the person included in the partial area, for the partial area selected in the step S121 (step S130). As described above, a movement state of a person includes information representing the crowd direction extracted in the step S125, and information representing presence or absence of crowd motion determined in the step S128 or the step S129. Moreover, information representing an area of the person includes the position and size of the partial area acquired in the step S124.

Then, the generation unit 44 determines whether there are any unselected partial areas among a plurality of partial areas (step S131). When there are unselected partial areas (YES in the step S131), the generation unit 44 returns the processing to the step S121. Then, the people area extraction unit 441 again selects one partial area from the unselected partial areas, among a plurality of partial areas (step S121). When there are no unselected partial areas (NO in the step S131), the generation unit 44 outputs people-flow information for each partial area generated in the step S130 (step S132).

Accordingly, the generation unit 44 ends the processing in the step S113.

Note that the motion amount estimation unit 13 of the people-flow estimation device 40 according to the present example embodiment may estimate a motion amount not for all partial areas, but for a partial area extracted by the people area extraction unit 441, based on reliability output by the crowd direction estimation unit 42.

Advantageous Effect

According to the people-flow estimation device 40 in the present example, the crowd direction estimation unit 42 estimates a crowd direction in a partial area of an image, and calculates reliability corresponding to the direction. Further, the motion amount estimation unit 13 estimates a motion amount in a partial area. Then, based on a crowd direction, reliability corresponding to a direction, and a motion amount, the generation unit 44 generates people-flow information being information regarding people-flow representing flow of people in the partial area. In this instance, the generation unit 44 determines, based on reliability, whether people are included in a partial area. With even such a configuration, the people-flow estimation device 40 can extract a partial area where a person exists. Therefore, in a way similar to the people-flow estimation device 10, the people-flow estimation device 40 according to the present example embodiment can estimate people-flow for a plurality of persons included in the input image, without tracking. In other words, the people-flow estimation device 40 according to the present example embodiment can highly accurately estimate people-flow from even the image captured under a congested environment in which overlap of people frequently occurs, and transmitted at a low frame rate. Moreover, the people-flow estimation device 40 does not include the function of the number-of-people estimation unit 11, and therefore can be simplified in implementation. In addition, in contrast to the people-flow estimation device 10, the people-flow estimation device 40 does not execute the processing of the number-of-people estimation unit 11, and therefore achieves speeding-up processing. Such a method is extremely effective when a number of people is not needed as people-flow.

Third Example Embodiment

Next, a third example embodiment is described with reference to the drawings. Note that the same reference signs are given to members similar to members described in each of the above-described example embodiments for convenience of description, and a description thereof is omitted.

Figure 13:
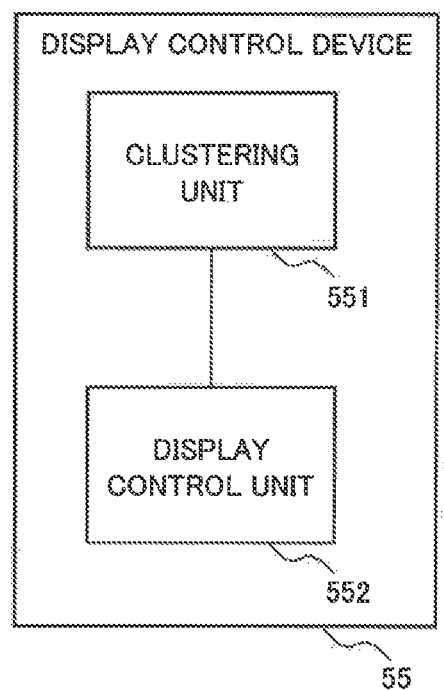
FIG. 13 is a functional block diagram illustrating one example of a functional configuration of a display control device according to a third example embodiment.

As illustrated in FIG. 13, a display control device 55 according to the present example embodiment includes a clustering unit 551 and a display control unit 552. For a partial area indicated as people-flow in an image, the clustering unit 551 performs clustering on partial areas of an image, based on a distance between partial areas, and similarity in a crowd direction and motion in a partial area.

The display control unit 552 calculates, for each cluster, a crowd state indicating an area, a direction, motion, and a number of people of a cluster obtained by clustering, based on information about people-flow in a partial area obtained by clustering, and displays the crowd state on a screen in a display mode differing from cluster to cluster. The display control unit 552 displays the crowd state on a screen, but may externally output the crowd state as information.

By such a configuration, the display control device 55 according to the present example embodiment can display, on a screen, a state of people-flow for each cluster, by use of information representing people-flow estimated from an image captured under a congested environment in which overlap of people frequently occurs, and transmitted at a low frame rate. Consequently, the display control device 55 enables a user seeing this screen to more clearly understand a state of people-flow.

Figure 14:
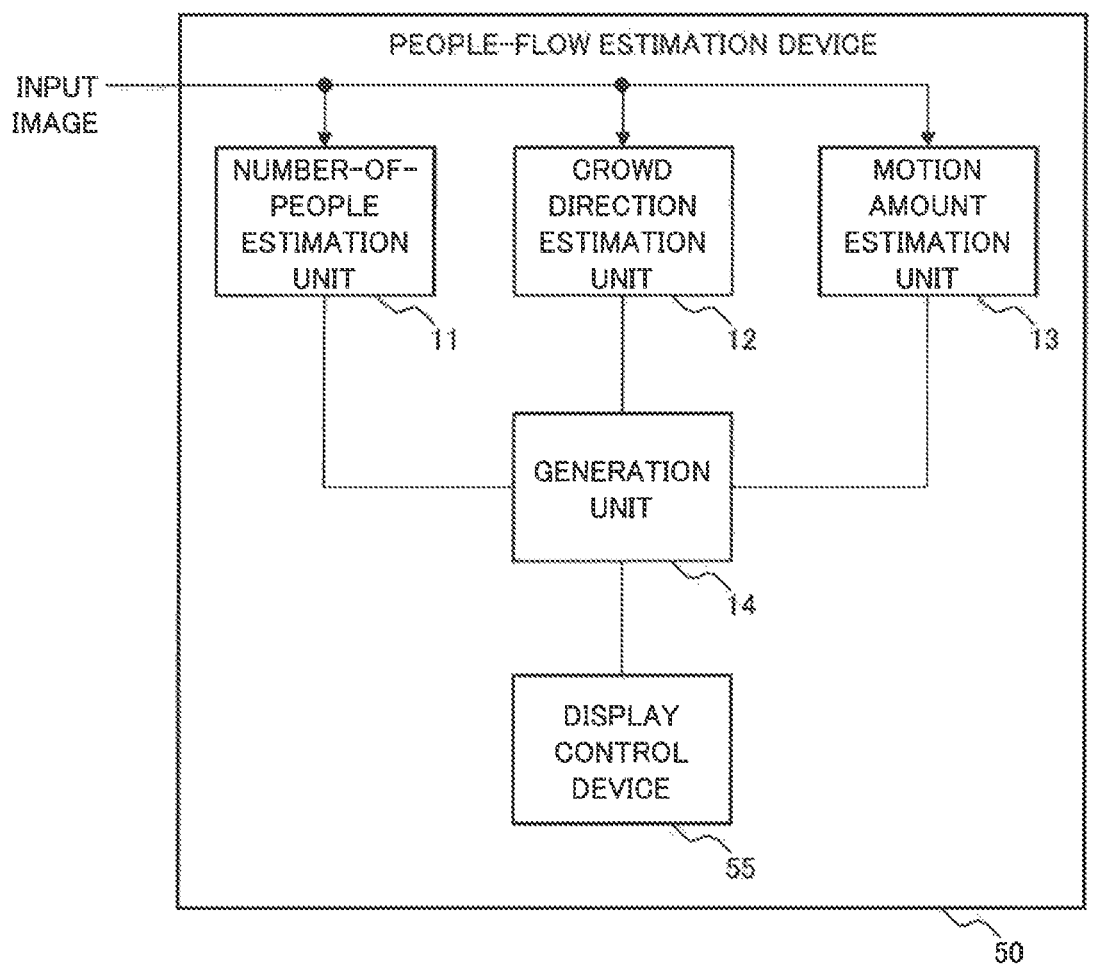
FIG. 14 is a functional block diagram illustrating one example of a functional configuration of the people-flow estimation device including the display control device according to the third example embodiment.

The display control device 55 according to the present example embodiment is described in further detail. First, a people-flow estimation device 50 including the display control device 55 according to the present example embodiment is described with reference to FIG. 14. As illustrated in FIG. 14, the people-flow estimation device 50 includes a number-of-people estimation unit 11, a crowd direction estimation unit 12, a motion amount estimation unit 13, a generation unit 14, and the display control device 55. The people-flow estimation device 50 has a configuration in which the display control device 55 is further included in the people-flow estimation device 10 according to the first example embodiment described above.

Figure 15:
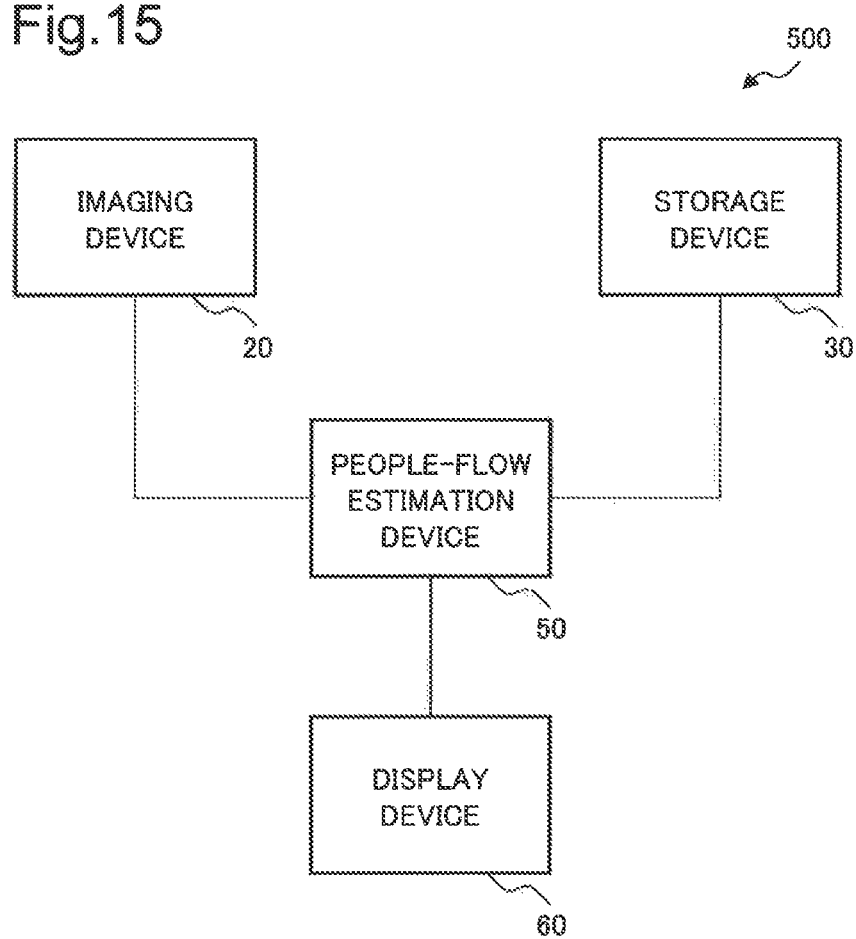
FIG. 15 is a block diagram illustrating one example of a configuration of a people-flow estimation system including the people-flow estimation device according to the third example embodiment.

FIG. 15 is a block diagram illustrating one example of a configuration of a people-flow estimation system 500 including the people-flow estimation device 50. As illustrated in FIG. 15, the people-flow estimation system 500 includes an imaging device 20, a storage device 30, the people-flow estimation device 50, and a display device 60. The display device 60 is communicably connected to the people-flow estimation device 50. The display device 60 is achieved by, for example, a liquid crystal display and the like. The display device 60 displays a screen based on control from the people-flow estimation device 50.

Returning to FIG. 13, each unit of the display control device 55 is described in detail. The display control device 55 obtains, as an input, people-flow information output from the generation unit 14.

As described above, people-flow information includes a number of people related to a partial area, a movement state of a person included in the partial area, and information representing an area of the person. A movement state of a person includes information representing a crowd direction related to a partial area, and information representing presence or absence of crowd motion. Moreover, information representing an area of the person includes a position and a size of a partial area in the input image.

The clustering unit 551 performs clustering on partial areas of an image, based on people-flow information. Specifically, the clustering unit 551 calculates a distance between partial areas from a position and a size of each partial area, included in people-flow information, indicated as people-flow. A distance between partial areas may be a simple distance by a position between partial areas, or may be a distance calculated by use of an index taking into consideration a size of a partial area in addition to a position of a partial area. The clustering unit 551 also calculates similarity in a crowd direction between partial areas. Further, the clustering unit 551 calculates similarity in motion between partial areas. Similarity in motion may be, for example, similarity in a motion amount, or similarity in presence or absence of motion determined from a motion amount.

Then, the clustering unit 551 performs clustering on partial areas of an image, based on the calculated similarity. Then, the clustering unit 551 supplies the display control unit 552 with people-flow information of a partial area obtained by clustering obtained as a result of clustering. In other words, for each cluster, the clustering unit 551 supplies the display control unit 552 with people-flow information of a partial area included in the cluster.

The display control unit 552 receives, for each cluster, people-flow information of a partial area included in the cluster from the clustering unit 551. The display control unit 552 obtains a crowd state indicating an area, a direction, motion, and a number of people of a cluster, for each cluster obtained by clustering.

An area of a cluster is an area calculated from a position and a size of a partial area belonging to a cluster obtained by clustering, and is an area including all partial areas belonging to the cluster.

A cluster direction is a crowd direction included in the cluster, and is an average value, a mode value, or the like calculated from a crowd direction related to each partial area belonging to a cluster obtained by clustering. A cluster direction may be any value other than the above-described values if calculated from a crowd direction related to each partial area belonging to a cluster obtained by clustering.

Motion of a cluster represents crowd motion included in a cluster, for example, presence or absence of crowd motion included in a cluster. Motion of a cluster is obtained from presence or absence of crowd motion included in each partial area belonging to a cluster obtained by clustering. When presence or absence of crowd motion in each partial area included in people-flow information is either information indicating presence of motion or information indicating absence of motion, the clustering unit 551 clusters in such a way that a partial area having information indicating presence of motion and a partial area having information indicating absence of motion belong to different clusters. Accordingly, both pieces of information about presence and absence of crowd motion related to each partial area belonging to a cluster are the same information. Therefore, when information representing crowd motion included in a cluster is information representing presence or absence of motion, information representing presence or absence of motion related to one of partial areas belonging to a cluster is information representing crowd motion included in a cluster.

A number of people of a cluster is a total number of people in each partial area belonging to a cluster obtained by clustering.

The display control unit 552 displays a crowd state on a screen in a display mode differing from cluster to cluster. In other words, the display control unit 552 generates a control signal which controls in such a way that a crowd state is displayed on a screen in a display mode differing from cluster to cluster, and outputs the crowd state to the display device 60.

Consequently, the display device 60 can display a screen based on the control signal.

Figure 16:
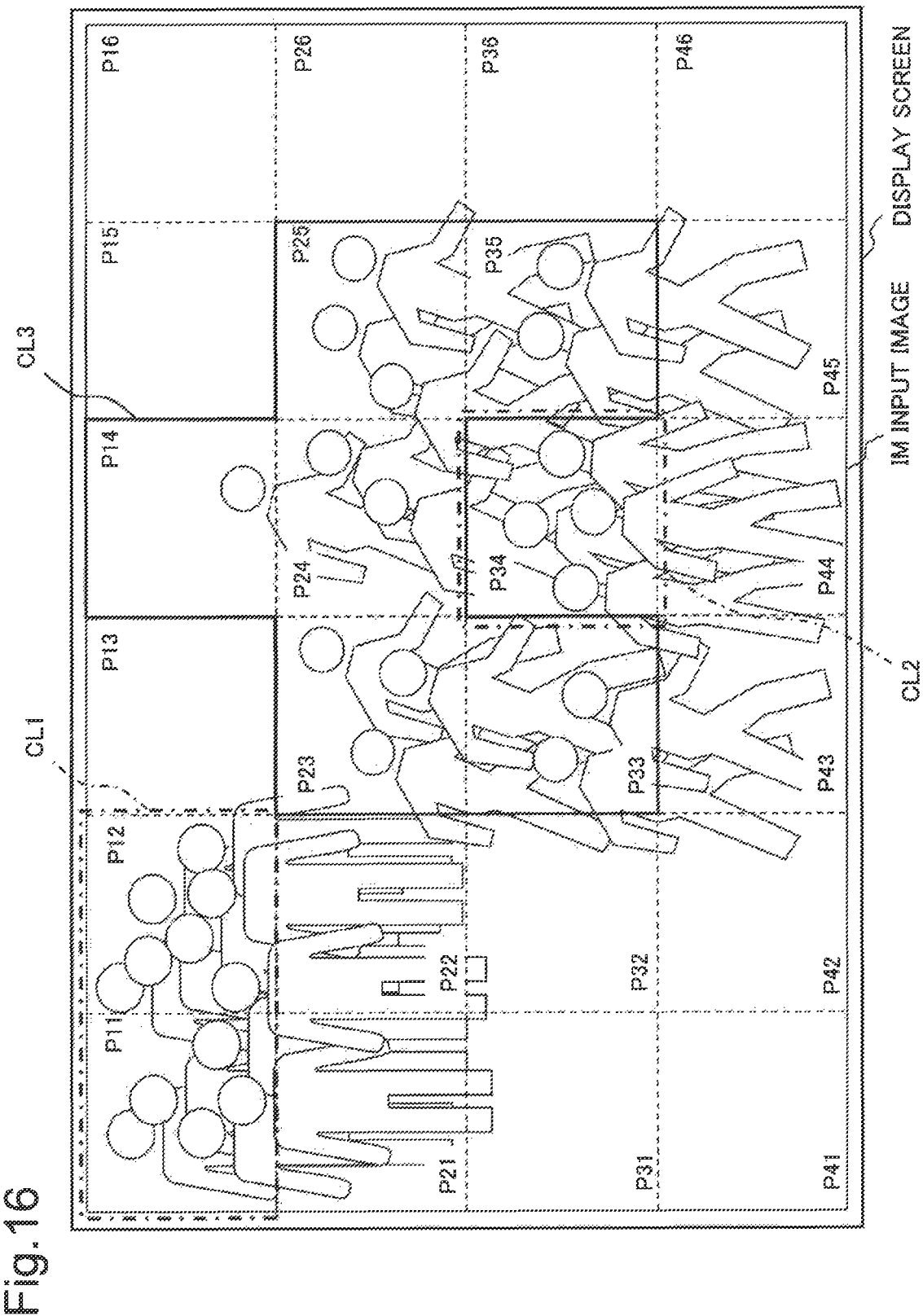
FIG. 16 is a view for describing a display screen displayed on a display device.

Next, examples of display screens displayed by the display device 60 are described with reference to FIGS. 16 to 18. FIG. 16 is a view for describing a screen (also referred to as a display screen) displayed by the display device 60. Moreover, FIG. 17 and FIG. 18 are views illustrating one example of a display screen displayed by the display device 60.

First, the input image displayed by the display device 60, and a partial area and a cluster of the input image are described by use of FIG. 16. As illustrated in FIG. 16, an input image IM is an image including a crowd exiting on an upper left side of the image, and a crowd exiting to the right of a center. In this example, it is assumed that 24 partial areas obtained by dividing the input image IM into 4 parts vertically and 6 parts laterally are set. In FIGS. 16 to 18, a border line between partial areas is represented by a broken line. Moreover, Pxy (x is a number of 1 to 4, and y is a number of 1 to 6) in FIG. 16 is a reference sign representing each partial area. Although a reference sign representing each partial area is not indicated in FIGS. 17 and 18 for convenience of description, it is assumed that the same reference sign is given to a partial area at the same position as that in FIG. 16.

Clusters CL1 to CL3 in FIG. 16 represent partial areas clustered by the clustering unit 551. The cluster CL1 includes a partial area P11 and a partial area P12. The cluster CL2 includes a partial area P34. The cluster CL3 includes a partial area P14, a partial area P23, a partial area P24, a partial area P25, a partial area P33, and a partial area P35.

Figure 17:
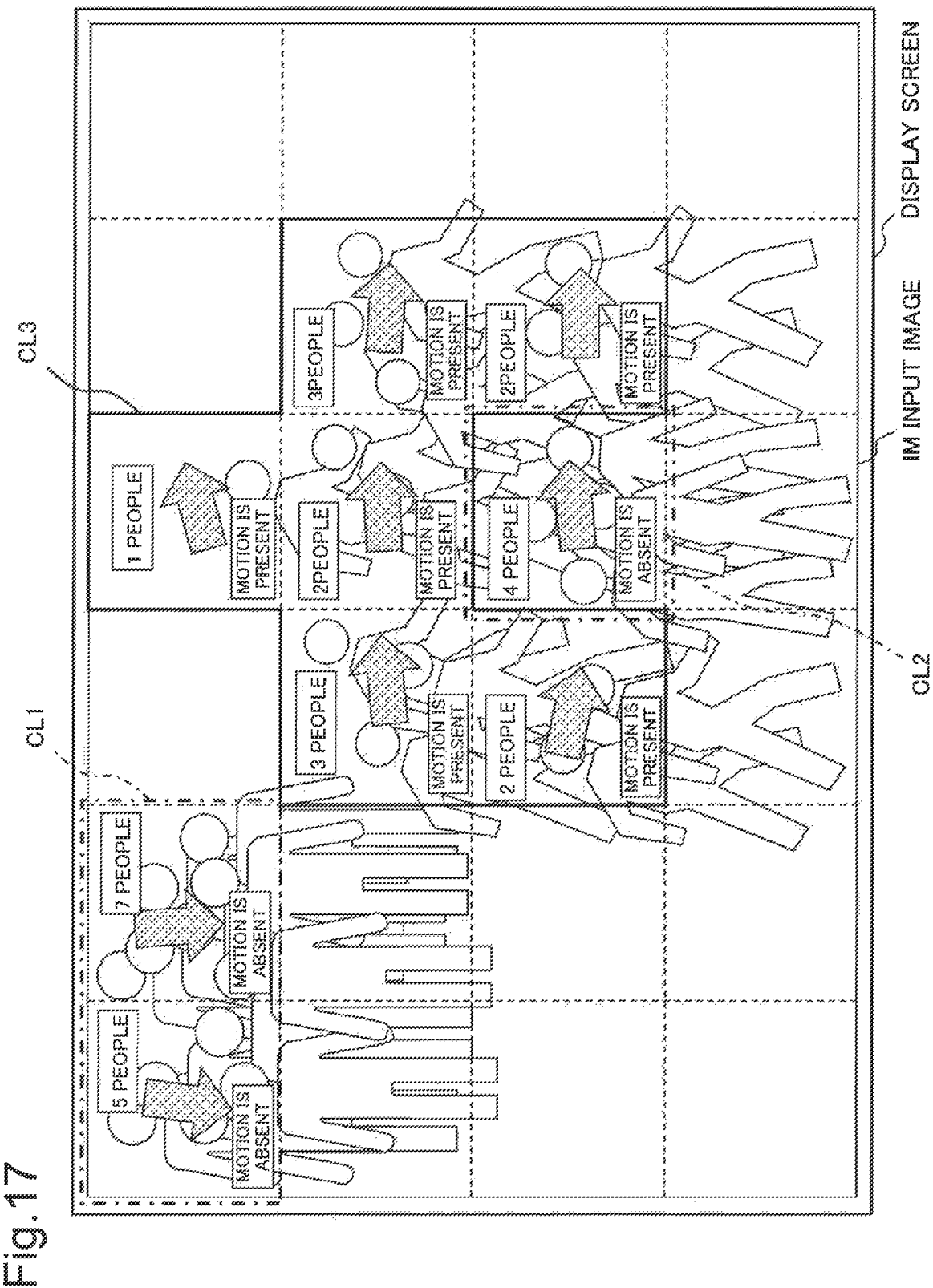
FIG. 17 is a view illustrating one example of a display screen displayed on the display device.
Figure 18:
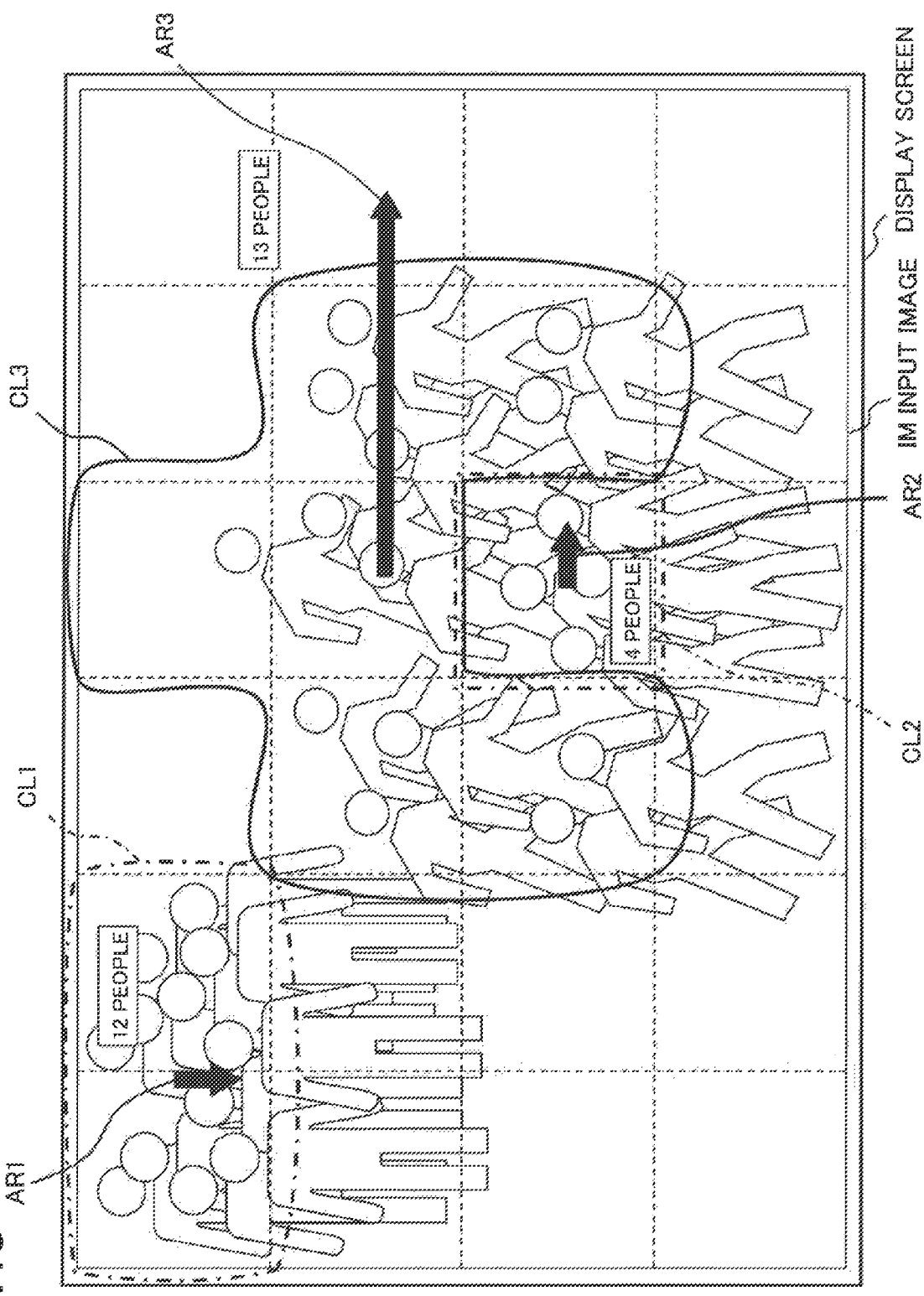
FIG. 18 is a view illustrating one example of a display screen displayed on the display device.

Next, a display screen displayed by the display device 60 is described by use of FIGS. 17 and 18. A broken line representing a border line between partial areas is indicated in FIG. 17 as in FIG. 16, but does not necessarily need to be indicated.

As illustrated in FIG. 17, a frame surrounding each of the clusters CL1 to CL3 is displayed on a display screen. In this way, the display control unit 552 preferably displays an area of a cluster in such a way as to surround a partial area belonging to the cluster. Note that an area of a cluster may be displayed on border lines of partial areas included in the cluster, for example, as a solid-line frame expressing the cluster CL3, as illustrated in FIG. 17. Alternatively, the display control unit 552 may display an area of a cluster in such a way as to surround a partial area as chain-line frames expressing the clusters CL1 and CL2 in FIG. 17. In addition, an area of a cluster displayed by the display control unit 552 does not necessarily need to be a frame combining straight lines as illustrated in FIG. 17, and may be a curved line as illustrated in FIG. 18.

Furthermore, in FIG. 17, a number of people, a crowd direction, and crowd motion included in people-flow information related to a partial area included in each cluster are displayed for each partial area. For example, it is assumed that people-flow information related to the partial area P11 includes information representing a number of people being "5", and, as a movement state of a person, looking-down and absence of motion. By use of this people-flow information, the display control unit 552 displays, in an area of the partial area P11, "5 people", "motion is absent" representing that motion is absent, and a downward arrow representing that a crowd is looking down. For other partial areas included in each cluster as well, character strings representing a number of people, an arrow, and presence or absence of motion are displayed. Note that presence or absence of motion may be expressed by use of, for example, a mark "o" or "x" instead of character strings.

Moreover, the display control unit 552 may further display information representing a crowd state on a screen illustrated in FIG. 17. For example, it is assumed that the cluster CL1 includes 12 people, and the crowd of 12 people are looking down and making no motion. The display control unit 552 may generate crowd state information representing such a crowd state, and display the crowd state information on a screen. The display control unit 552 may display, as crowd state information, a character string expressing a crowd state "a crowd of 12 people looking down and remaining unmoving", by use of a balloon or the like related to the cluster CL1. Similarly, the display control unit 552 may display, on a screen, a character string expressing a crowd state "a crowd of 4 people looking rightward and remaining unmoving" for the cluster CL2, and may display, on a screen, a character string expressing a crowd state "a crowd of 13 people moving rightward" for the cluster CL3. Note that, in this instance, the display control unit 552 generates crowd state information by use of a word "move" from information representing presence or absence of motion when motion is present, and generates crowd state information by use of words "remain unmoving" when motion is absent. However, words representing presence or absence of motion are not limited thereto.

Alternatively, as illustrated in FIG. 18, the display control unit 552 may display, on a display screen, arrows (AR1 to AR3) each expressing a crowd direction and crowd motion by a direction and a size, respectively. Thus, the display control device 55 enables a user to more clearly understand a state of people-flow. For example, the short arrows AR1 and AR2 representing that crowds remain unmoving are displayed in the cluster CL1 and the cluster CL2 in which crowds remain unmoving, respectively. A direction of the arrow represents a crowd direction. Moreover, the rightward long arrow AR3 representing that a crowd is moving is displayed the cluster CL3. The display control unit 552 may display an arrow in such a way as to change length of the arrow depending on a speed of a crowd. Additionally, the display control unit 552 preferably displays an arrow in such a way that an origin of the arrow is located substantially in a center of gravity of an area of a cluster. This enables a user to more clearly understand for which cluster the arrow is intended.

Furthermore, as illustrated in FIG. 18, the display control unit 552 displays a number of people of a cluster in such a way as to be located inside or near an area of a cluster. For example, for the cluster CL1, the display control unit 552 displays 12 people being a number of people in the cluster CL1, within a frame representing the cluster CL1. Moreover, for example, for the cluster CL3, the display control unit 552 displays 13 people being a number of people in the cluster CL3, near a frame representing the cluster CL3.

In this way, the display control device 55 displays cluster information, and thereby enables a user to more clearly understand a state of people-flow for each cluster.

Note that people-flow information for each partial area as illustrated in FIG. 17 may be displayed over cluster information on a display screen in FIG. 18.

Figure 19:
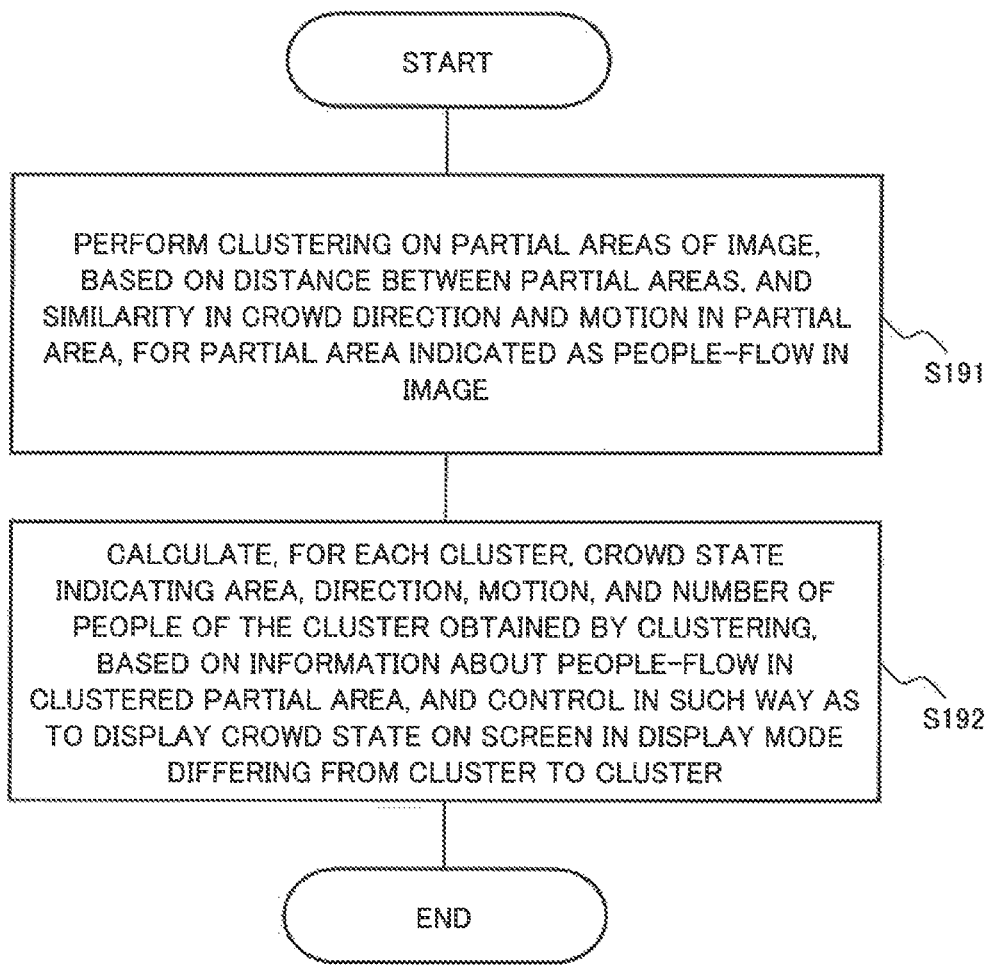
FIG. 19 is a flowchart illustrating one example of an operation of the display control device according to the third example embodiment.

FIG. 19 is a flowchart illustrating one example of an operation of the display control device 55 according to the present example embodiment. In FIG. 19, it is assumed that the clustering unit 551 of the display control device 55 receives people-flow information from the generation unit 14.

As illustrated in FIG. 19, the clustering unit 551 perform clustering on partial areas of an image, based on a distance between partial areas, and similarity in a direction and motion in a partial area, for a partial area indicated as people-flow in an image (step S191).

The display control unit 552 calculates, for each cluster, a crowd state indicating an area, a direction, motion, and a number of people of a cluster obtained by clustering, based on information about people-flow in a partial area obtained by clustering, and controls in such a way as to display a crowd state on a screen in a display mode differing from cluster to cluster (step S192).

Accordingly, the display control device 55 ends the processing.

Advantageous Effect

As described above, the display control device 55 according to the present example embodiment performs clustering on partial areas, based on people-flow information for each partial area, and based on a distance between partial areas, and similarity in a crowd direction and motion in a partial area. Then, based on people-flow information for a partial area obtained by clustering, the display control device 55 calculates a crowd state for each cluster, and displays the calculated crowd state on a display device in a display mode differing from cluster to cluster. Thus, a screen in which a crowd state is displayed in a display mode differing from cluster to cluster is displayed on a display device. In this way, people-flow is displayed in an emphasized way in a unit referred to as a crowd state a meaning of which is easy to understand, thus enabling a user seeing this screen to more clearly understand a state of people-flow. In this way, the display control device 55 displays a crowd state for each cluster, and therefore enables a user to visually understand a state of people-flow more clearly.

Furthermore, the people-flow estimation device 50 including such a display control device 55 can highly accurately estimate people-flow from even the image captured under a congested environment and transmitted at a low frame rate, in a way similar to the people-flow estimation device 10 described above.

A configuration in which the display control device 55 according to the present example embodiment is provided in the people-flow estimation device 10 according to the above-described first example embodiment is described above. However, the display control device 55 may be configured to be provided in the people-flow estimation device 40 according to the second example embodiment. In other words, the people-flow estimation device 40 may be configured to further include the display control device 55 in addition to the crowd direction estimation unit 42, the motion amount estimation unit 13, and the generation unit 44. In this case, since people-flow information does not include information about a number of people, the display control device 55 can display a crowd direction and motion. Consequently, the people-flow estimation device 40 also enables a user to visually understand a state of people-flow more clearly, in a way similar to the people-flow estimation device 50 according to the present example embodiment.

Moreover, the display control device 55 according to the present example embodiment may be configured to include therein the number-of-people estimation unit 11, the crowd direction estimation unit 12, the motion amount estimation unit 13, and the generation unit 14 which are included in the people-flow estimation device 50. In other words, the display control device 55 may have a function similar to that of the people-flow estimation device 50.

(Regarding Hardware Configuration)

In each example embodiment of the present disclosure, each component of each people-flow estimation device and display control device presents a block of a functional unit. Each component of each people-flow estimation device and display control device is partly or entirely achieved by, for example, any combination of an information processing device 900 and a program as illustrated in FIG. 20. FIG. 20 is a block diagram illustrating one example of a configuration of a hardware configuration of the information processing device 900 which achieves each component of each people-flow estimation device and display control device. The information processing device 900 includes the following components as one example.

A central processing unit (CPU) 901
A read only memory (ROM) 902
A random access memory (RAM) 903
A program 904 loaded onto the RAM 903
A storage device 905 saving the program 904
A drive device 907 which reads and writes in a recording medium 906
A communication interface 908 connected to a communication network 909

An input/output interface 910 which inputs and outputs data
A bus 911 which connects each component Each component of each people-flow estimation device and display control device in each example embodiment is achieved when the CPU 901 acquires and executes the program 904 which achieves a function of each component. The program 904 which achieves a function of each component of each people-flow estimation device is previously saved in, for example, the storage device 905 or the ROM 902, and is read by the CPU 901 according to need. Note that the program 904 may be supplied to the CPU 901 via the communication network 909, or may be previously saved in the recording medium 906, and the drive device 907 may read the program and supply the program to the CPU 901.

There are various modification examples of a method of achieving each people-flow estimation device and display control device. For example, each people-flow estimation device may be achieved by any combination of the information processing device 900 and a program separate for each component. Alternatively, a plurality of components provided in each people-flow estimation device and display control device may be achieved by any combination of one information processing device 900 and a program.

Furthermore, each component of each people-flow estimation device and display control device is partly or entirely achieved by another general-purpose or dedicated circuit, processor, or the like, or a combination thereof. These may be configured by a single chip, or a plurality of chips connected via a bus.

Each component of each people-flow estimation device and display control device may be partly or entirely achieved by a combination of the above-described circuit or the like and a program.

When each component of each people-flow estimation device and display control device is partly or entirely achieved by a plurality of information processing devices, circuits, or the like, the plurality of information processing devices, circuits, or the like may be centralizedly arranged or distributedly arranged. For example, an information processing device, a circuit, or the like may be achieved as a form, such as a client and server system, a cloud computing system, or the like, in which each information processing device, circuit, or the like is connected via a communication network.

Note that each example embodiment described above is a preferred example embodiment of the present disclosure, and the scope of the present disclosure is not limited only to each example embodiment described above. A person skilled in the art may make a modification or substitution in each example embodiment described above without departing from the spirit of the present disclosure, and is possible to construct a form in which various modifications are made.

The people-flow estimation device according to each example embodiment of the present disclosure is applicable to such a purpose as a people-flow estimation device which can estimate people-flow from a moving image captured under a congested environment and transmitted at a low frame rate, or a program for achieving the people-flow estimation device in a computer. The people-flow estimation device of the present disclosure is also applicable to such a purpose as a device and a function which recognize a suspicious person and leaving of a suspicious object, recognize an abnormal situation, or recognize abnormal behavior, in a surveillance field where people-flow needs to be estimated from a camera and accumulated video images. The people-flow estimation device of the present disclosure is also applicable to such a purpose as a device and a function which analyze an action or analyze an environmental situation in a marketing field. The people-flow estimation device of the present disclosure is further applicable to such a purpose as an input interface in which people-flow being a result of people-flow estimation from a camera and accumulated video images is an input. In addition, the people-flow estimation device of the present disclosure is applicable to such a purpose as a video or video image search device and function in which people-flow being a result of people-flow estimation is a trigger key.

The whole or part of the example embodiments described above can be described as, but not limited to, the following supplementary notes.

(Supplementary Note 1)

A people-flow estimation device comprising:

number-of-people estimation means for estimating a number of people included in a partial area of an image;

crowd direction estimation means for estimating a crowd direction in the partial area;

motion amount estimation means for estimating a motion amount in the partial area; and generation means for:

extracting a partial area where a person exists, from a plurality of the partial areas, based on the number of people, and generating, based on the number of people, the extracted partial area, and the crowd direction and the motion amount related to the partial area, people-flow information regarding people-flow representing flow of people in the partial area, wherein the people-flow information includes the number of people related to the partial area, a movement state of a person included in the partial area, and information representing an area of the person.

(Supplementary Note 2)

The people-flow estimation device according to Supplementary Note 1, wherein the area of the person is a position and a size of the extracted partial area in the image, and the movement state of the person is the crowd direction and presence or absence of motion in the partial area being related to the extracted partial area.

(Supplementary Note 3)

The people-flow estimation device according to Supplementary Note 2, wherein the generation means determines whether the motion amount related to the partial area is more than a predetermined value, and when the motion amount is more than the predetermined value, the generation means determines that motion is present in the partial area, or when the motion amount is less than or equal to the predetermined value, the generation means determines that motion is absent in the partial area.

(Supplementary Note 4)

The people-flow estimation device according to any one of Supplementary Notes 1 to 3, wherein the generation means extracts, as the partial area where a person exists, a partial area where the estimated number of people is more than a predetermined value, and generates the people-flow information for the extracted partial area.

(Supplementary Note 5)

The people-flow estimation device according to any one of Supplementary Notes 1 to 4, wherein the crowd direction estimation means estimates the crowd direction for a partial area extracted by the generation means;

the motion amount estimation means estimate the motion amount for a partial area extracted by the generation means; and the generation means generates the people-flow information, based on the crowd direction and the motion amount estimated for the extracted partial area.

(Supplementary Note 6)

The people-flow estimation device according to any one of Supplementary Notes 1 to 5, wherein the number-of-people estimation means estimates the number of people by use of an estimator acquired by learning for each partial area.

(Supplementary Note 7)

A people-flow estimation device comprising:

crowd direction estimation means for estimating a crowd direction in a partial area of an image, and calculating reliability corresponding to the direction;

motion amount estimation means for estimating a motion amount in the partial area; and generation means for generating, based on the crowd direction, the reliability corresponding to the direction, and the motion amount, people-flow information regarding people-flow representing flow of people in the partial area.

(Supplementary Note 8)

The people-flow estimation device according to Supplementary Note 7, further comprising:

clustering means for performing clustering on a partial area of the image, based on similarity in people-flow information related to the partial area; and display control means for calculating, for each cluster, a crowd state of a cluster obtained by clustering, based on the people-flow information for the partial area obtained by clustering, and controlling in such a way as to display the crowd state on a screen in a display mode differing from cluster to cluster.

(Supplementary Note 9)

The people-flow estimation device according to any one of Supplementary Notes 1 to 8, wherein the crowd direction estimation means estimates the crowd direction by use of an estimator acquired by learning for each partial area.

(Supplementary Note 10)

The people-flow estimation device according to any one of Supplementary Notes 1 to 9, wherein the motion amount estimation means estimates the motion amount by use of an estimator acquired by learning for each partial area.

(Supplementary Note 11)

A display control device comprising:

clustering means for performing clustering, for a partial area indicated as people-flow in an image, on a partial area of the image, based on a distance between partial areas, and similarity in a crowd direction and motion in a partial area; and display control means for calculating, for each cluster, a crowd state indicating an area, a direction, motion, and a number of people of a cluster obtained by clustering, based on information about people-flow in the partial area obtained by clustering, and controlling in such a way as to display the crowd state on a screen in a display mode differing from cluster to cluster.

(Supplementary Note 12)

The display control device according to Supplementary Note 11, wherein the display control means displays, for each of the clusters, an area of the cluster in such a way as to surround a partial area belonging to the cluster, displays an arrow in such a way as to express the cluster direction and the cluster motion by a direction and a size of the arrow, respectively, and displays the number of people in the cluster in such a way as to be located inside or near an area of the cluster.

(Supplementary Note 13)

The display control device according to Supplementary Note 11 or 12, further comprising:

number-of-people estimation means for estimating a number of people included in a partial area of an image;

crowd direction estimation means for estimating a crowd direction in the partial area;

motion amount estimation means for estimating a motion amount in the partial area; and generation means for extracting a partial area where a person exists, from a plurality of the partial areas, based on the number of people, and generating, based on the number of people, the extracted partial area, and the crowd direction and the motion amount being related to the partial area, people-flow information being information regarding people-flow representing flow of people in the partial area, the people-flow information including the number of people related to the partial area, a movement state of a person included in the partial area, and information representing an area of the person, wherein the clustering means performs clustering on a partial area related to the people-flow information, based on the people-flow information generated by the generation means.

(Supplementary Note 14)

A people-flow estimation method comprising:

estimating a number of people included in a partial area of an image;

estimating a crowd direction in the partial area;

estimating a motion amount in the partial area; and extracting a partial area where a person exists, from a plurality of the partial areas, based on the number of people, and generating, based on the number of people, the extracted partial area, and the crowd direction and the motion amount being related to the partial area, people-flow information being information regarding people-flow representing flow of people in the partial area, the people-flow information including the number of people related to the partial area, a movement state of a person included in the partial area, and information representing an area of the person.

(Supplementary Note 15)

The people-flow estimation method according to Supplementary Note 14, wherein the area of the person is a position and a size of the extracted partial area in the image, and the movement state of the person is the crowd direction and presence or absence of motion in the partial area being related to the extracted partial area.

(Supplementary Note 16)

A people-flow estimation method comprising:

estimating a crowd direction in a partial area of an image, and calculating reliability corresponding to the direction;

estimating a motion amount in the partial area; and generating, based on the crowd direction, the reliability corresponding to the direction, and the motion amount, people-flow information being information regarding people-flow representing flow of people in the partial area.

(Supplementary Note 17)

The people-flow estimation method according to Supplementary Note 16, further comprising:

performing clustering on a partial area of the image, based on similarity in people-flow information related to the partial area; and calculating, for each cluster, a crowd state of a cluster obtained by clustering, based on the people-flow information for the partial area obtained by clustering, and controlling in such a way as to display the crowd state on a screen in a display mode differing from cluster to cluster.

(Supplementary Note 18)

A display control method comprising:

performing clustering, for a partial area indicated as people-flow in an image, on a partial area of the image, based on a distance between partial areas, and similarity in a crowd direction and motion in a partial area; and calculating, for each cluster, a crowd state indicating an area, a direction, motion, and a number of people of a cluster obtained by clustering, based on information about people-flow in the partial area obtained by clustering, and controlling in such a way as to display the crowd state on a screen in a display mode differing from cluster to cluster.

(Supplementary Note 19)

The display control method according to Supplementary Note 18, further comprising: controlling in such a way that, on the screen, an area of the cluster is displayed for each of the clusters in such a way as to surround a partial area belonging to the cluster, an arrow is displayed in such a way as to express the cluster direction and the cluster motion by a direction and a size of the arrow, respectively, and the number of people in the cluster is displayed in such a way as to be located inside or near an area of the cluster.

(Supplementary Note 20)

A computer-readable non-transitory recording medium recording a program which causes a computer to execute:

processing of estimating a number of people included in a partial area of an image;

processing of estimating a crowd direction in the partial area;

processing of estimating a motion amount in the partial area; and processing of extracting a partial area where a person exists, from a plurality of the partial areas, based on the number of people, and generating, based on the number of people, the extracted partial area, and the crowd direction and the motion amount being related to the partial area, people-flow information being information regarding people-flow representing flow of people in the partial area, the people-flow information including the number of people related to the partial area, a movement state of a person included in the partial area, and information representing an area of the person.

(Supplementary Note 21)

The recording medium according to Supplementary Note 20, wherein the area of the person is a position and a size of the extracted partial area in the image, and the movement state of the person is the crowd direction and presence or absence of motion in the partial area being related to the extracted partial area.

(Supplementary Note 22)

A computer-readable non-transitory recording medium recording a program which causes a computer to execute:

processing of estimating a crowd direction in a partial area of an image, and calculating reliability corresponding to the direction;

processing of estimating a motion amount in the partial area; and processing of generating, based on the crowd direction, the reliability corresponding to the direction, and the motion amount, people-flow information being information regarding people-flow representing flow of people in the partial area.

(Supplementary Note 23)

The recording medium according to Supplementary Note 22, further causing a computer to execute:

processing of performing clustering on a partial area of the image, based on similarity in people-flow information related to the partial area; and processing of calculating, for each cluster, a crowd state of a cluster obtained by clustering, based on the people-flow information for the partial area obtained by clustering, and controlling in such a way as to display the crowd state on a screen in a display mode differing from cluster to cluster.

(Supplementary Note 24)

A computer-readable non-transitory recording medium recording a program which causes a computer to execute:

processing of performing clustering, for a partial area indicated as people-flow in an image, on a partial area of the image, based on a distance between partial areas, and similarity in a crowd direction and motion in a partial area; and processing of calculating, for each cluster, a crowd state indicating an area, a direction, motion, and a number of people of a cluster obtained by clustering, based on information about people-flow in the partial area obtained by clustering, and controlling in such a way as to display the crowd state on a screen in a display mode differing from cluster to cluster.

(Supplementary Note 25)

The recording medium according to Supplementary Note 24, wherein the processing of controlling is processing of controlling in such a way that an area of the cluster is displayed for each of the clusters in such a way as to surround a partial area belonging to the cluster, an arrow is displayed in such a way as to express the cluster direction and the cluster motion by a direction and a size of the arrow, respectively, and the number of people in the cluster is displayed in such a way as to be located inside or near an area of the cluster.

REFERENCE SIGNS LIST

10 People-flow estimation device
11 Number-of-people estimation unit
12 Crowd direction estimation unit
13 Motion amount estimation unit
14 Generation unit
141 People area extraction unit
142 People-flow information generation unit
20 Imaging device
30 Storage device
40 People-flow estimation device
42 Crowd direction estimation unit
44 Generation unit
441 People area extraction unit
442 People-flow information generation unit
50 People-flow estimation device
55 Display control device
60 Display device
100 People-flow estimation system
500 People-flow estimation system

The invention claimed is:

1. A people-flow estimation system comprising:
at least one memory storing a computer program; and
at least one processor configured to execute the computer program to perform:
estimating a direction of a crowd in a partial area of an image, and calculating reliability corresponding to the estimated direction;
estimating motion of the crowd in the partial area;
generating people-flow information indicating flow of people in the partial area based on the direction of the crowd, the motion of the crowd, and the reliability corresponding to the direction;
clustering partial areas, including the partial area, that are adjacent each other in the image and similar in a crowd direction and motion in the partial areas;
calculating a crowd state for the crowd based on the people-flow information regarding the clustered partial areas; and
controlling a screen to display the crowd state in a mode different for each of a plurality of crowds including the crowd.

2. The people-flow estimation system according to claim 1, wherein
the at least one processor is configured to execute the computer program to perform:
estimating the direction of the crowd and the motion of the crowd in the partial areas where more than a predetermined number of people exist.

3. The people-flow estimation system according to claim 1, wherein
the at least one processor is configured to execute the computer program to perform:
calculating and outputting reliability of the direction of the crowd, the reliability represented by a size of a vector indicating the direction of the crowd.

4. The people-flow estimation system according to claim 1, wherein
the at least one processor is configured to execute the computer program to perform:
calculating and outputting reliability of the direction of the crowd, the reliability corresponding to an angle of the direction of the crowd.

5. The people-flow estimation system according to claim 1, wherein
the at least one processor is configured to execute the computer program to perform:
inputting a partial area image to an estimator to obtain a probability corresponding to an angle indicating a direction of crowd; and
obtaining reliability of the direction of crowd from the probability corresponding to the angle.

6. A people-flow estimation method comprising:
estimating a direction of a crowd in a partial area of an image, and calculating reliability corresponding to the estimated direction;
estimating motion of the crowd in the partial area; and
generating people-flow information indicating flow of people in the partial area based on the direction of the crowd, the motion of the crowd, and the reliability corresponding to the direction
clustering partial areas, including the partial area, that are adjacent each other in the image and similar in a crowd direction and motion in the partial areas;
calculating a crowd state for the crowd based on the people-flow information regarding the clustered partial areas; and
controlling a screen to display the crowd state in a mode different for each of a plurality of crowds including the crowd.

7. The people-flow estimation method according to claim 6, wherein
estimating the direction of the crowd and the motion of the crowd in the partial areas where more than a predetermined number of people exist.

8. The people-flow estimation method according to claim 6, wherein
calculating and outputting reliability of the direction of the crowd, the reliability represented by a size of a vector indicating the direction of the crowd.

9. The people-flow estimation method according to claim 6, wherein
calculating and outputting reliability of the direction of the crowd, the reliability corresponding to an angle of the direction of the crowd.

10. The people-flow estimation method according to claim 6, wherein
inputting a partial area image to an estimator to obtain a probability corresponding to an angle indicating a direction of crowd; and
obtaining reliability of the direction of crowd from the probability corresponding to the angle.

11. A non-transitory recording medium storing computer program, the computer program causing a computer to perform:
estimating a direction of a crowd in a partial area of an image, and calculating reliability corresponding to the estimated direction;
estimating motion of the crowd in the partial area;
generating people-flow information indicating flow of people in the partial area based on the direction of the crowd, the motion of the crowd, and the reliability corresponding to the direction;
clustering partial areas, including the partial area, that are adjacent each other in the image and similar in a crowd direction and motion in the partial areas;
calculating a crowd state for the crowd based on the people-flow information regarding the clustered partial areas; and
controlling a screen to display the crowd state in a mode different for each of a plurality of crowds including the crowd.

12. The non-transitory recording medium according to claim 11, wherein
the computer program causes the computer to perform:
estimating the direction of the crowd and the motion of the crowd in the partial areas where more than a predetermined number of people exist.

13. The non-transitory recording medium according to claim 11, wherein
the computer program causes the computer to perform:
calculating and outputting reliability of the direction of the crowd, the reliability represented by a size of a vector indicating the direction of the crowd.

14. The non-transitory recording medium according to claim 11, wherein
the computer program causes the computer to perform:
calculating and outputting reliability of the direction of the crowd, the reliability corresponding to an angle of the direction of the crowd.

15. The non-transitory recording medium according to claim 11, wherein
the computer program causes the computer to perform:
inputting a partial area image to an estimator to obtain a probability corresponding to an angle indicating a direction of crowd; and
obtaining reliability of the direction of crowd from the probability corresponding to the angle.

* * * * *